United States Patent [19]
Park

[11] Patent Number: 5,935,189
[45] Date of Patent: Aug. 10, 1999

[54] SYSTEM AND METHOD FOR MONITORING ENGINE PERFORMANCE CHARACTERISTICS

[75] Inventor: Kyong M. Park, Thousand Oaks, Calif.

[73] Assignee: Kavlico Corporation, Moorpark, Calif.

[21] Appl. No.: 09/001,745

[22] Filed: Dec. 31, 1997

[51] Int. Cl.[6] .................................................. G01M 15/00
[52] U.S. Cl. ......................... 701/111; 73/35.12; 73/117.3
[58] Field of Search ............................. 73/47, 116, 117.2,
73/117.3, 118.1, 115, 49.7, 35.11, 35.12,
35.13; 123/419, 436; 701/110, 111

[56] References Cited

U.S. PATENT DOCUMENTS

| | | | |
|---|---|---|---|
| 3,924,457 | 12/1975 | Oshima et al. | 73/116 |
| 3,965,677 | 6/1976 | Goto et al. | 60/277 |
| 3,983,754 | 10/1976 | Deguchi et al. | 73/346 |
| 4,040,294 | 8/1977 | Matsuda et al. | 73/117.3 |
| 4,083,234 | 4/1978 | Aono et al. | 73/116 |
| 4,189,940 | 2/1980 | Hulls et al. | 73/117.3 |
| 4,302,814 | 11/1981 | Full et al. | 364/551 |
| 4,329,732 | 5/1982 | Kavli et al. | 361/283 |
| 4,388,668 | 6/1983 | Bell et al. | 361/283 |
| 4,398,426 | 8/1983 | Park et al. | 73/724 |
| 4,617,607 | 10/1986 | Park et al. | 361/283 |
| 4,892,075 | 1/1990 | Iriyama et al. | 123/425 |
| 4,928,255 | 5/1990 | Brennecke et al. | 364/558 |
| 5,044,195 | 9/1991 | James et al. | 73/117.3 |
| 5,127,262 | 7/1992 | Demizu et al. | 73/117.3 |
| 5,269,178 | 12/1993 | Vigmostad et al. | 73/116 |
| 5,349,864 | 9/1994 | Park et al. | 73/724 |
| 5,369,989 | 12/1994 | Gates et al. | 73/115 |
| 5,386,722 | 2/1995 | Meyer et al. | 73/115 |
| 5,442,954 | 8/1995 | Fukui et al. | 73/115 |
| 5,698,776 | 12/1997 | Tomisawa | 73/115 |

Primary Examiner—George Dombroske
Attorney, Agent, or Firm—Oppenheimer Wolff & Donnelly LLP

[57] ABSTRACT

A system and method for monitoring engine performance characteristics such as knock and misfire. The system includes a pressure sensor coupled to an exhaust manifold of an engine being monitored by the system, a motion sensor operatively coupled to the engine's block, an engine position sensor, a load sensor and a processor adapted to independently process the outputs of the pressure sensor and the motion sensor to determine an occurrence of a knock event. The outputs of the pressure sensor and engine position sensor are processed to identify which cylinders are knocking. The outputs of the pressure sensor, load sensor and engine position sensor are processed to determine an occurrence of a misfire condition and to identify which cylinders are misfiring.

24 Claims, 14 Drawing Sheets

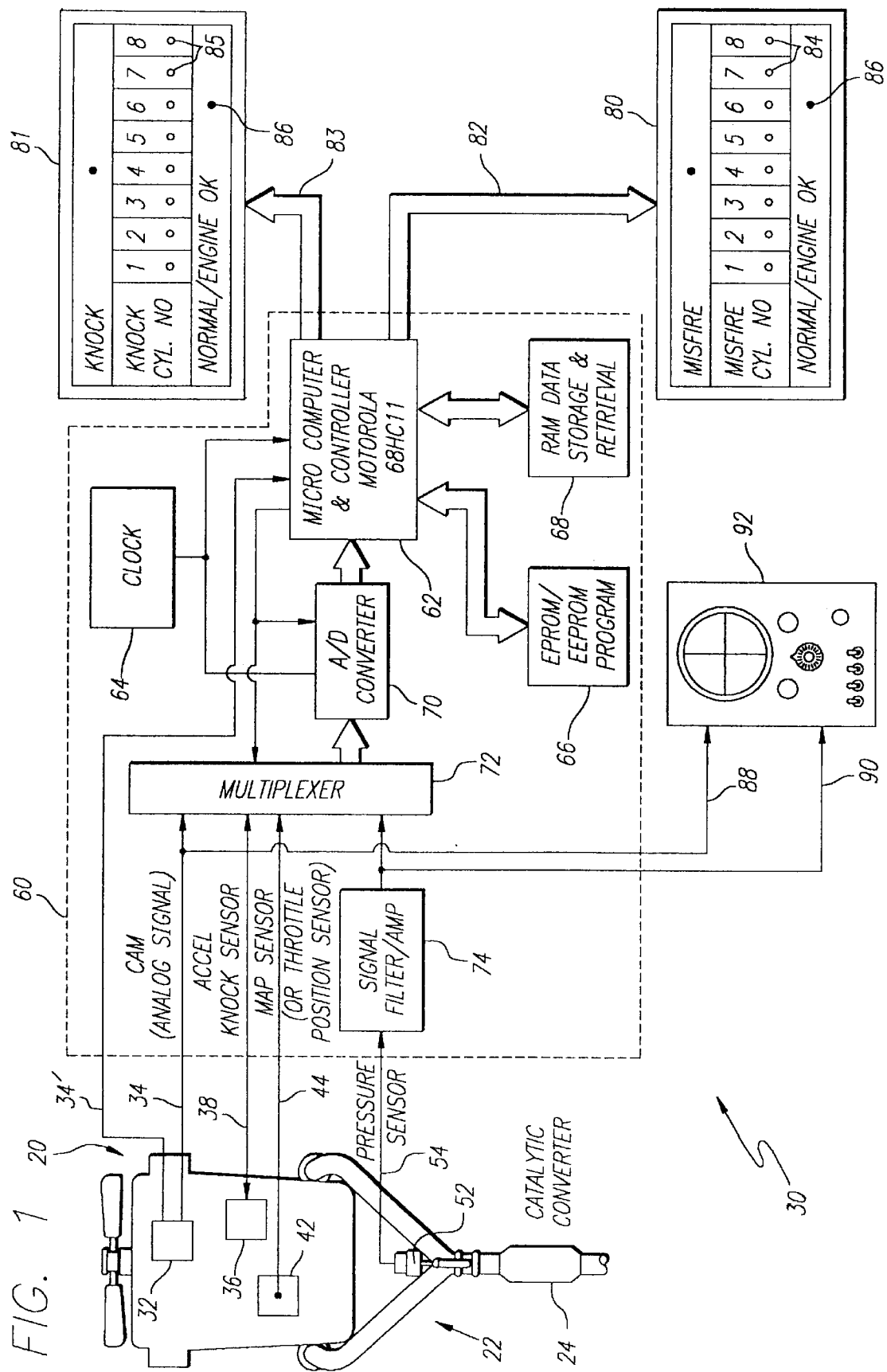

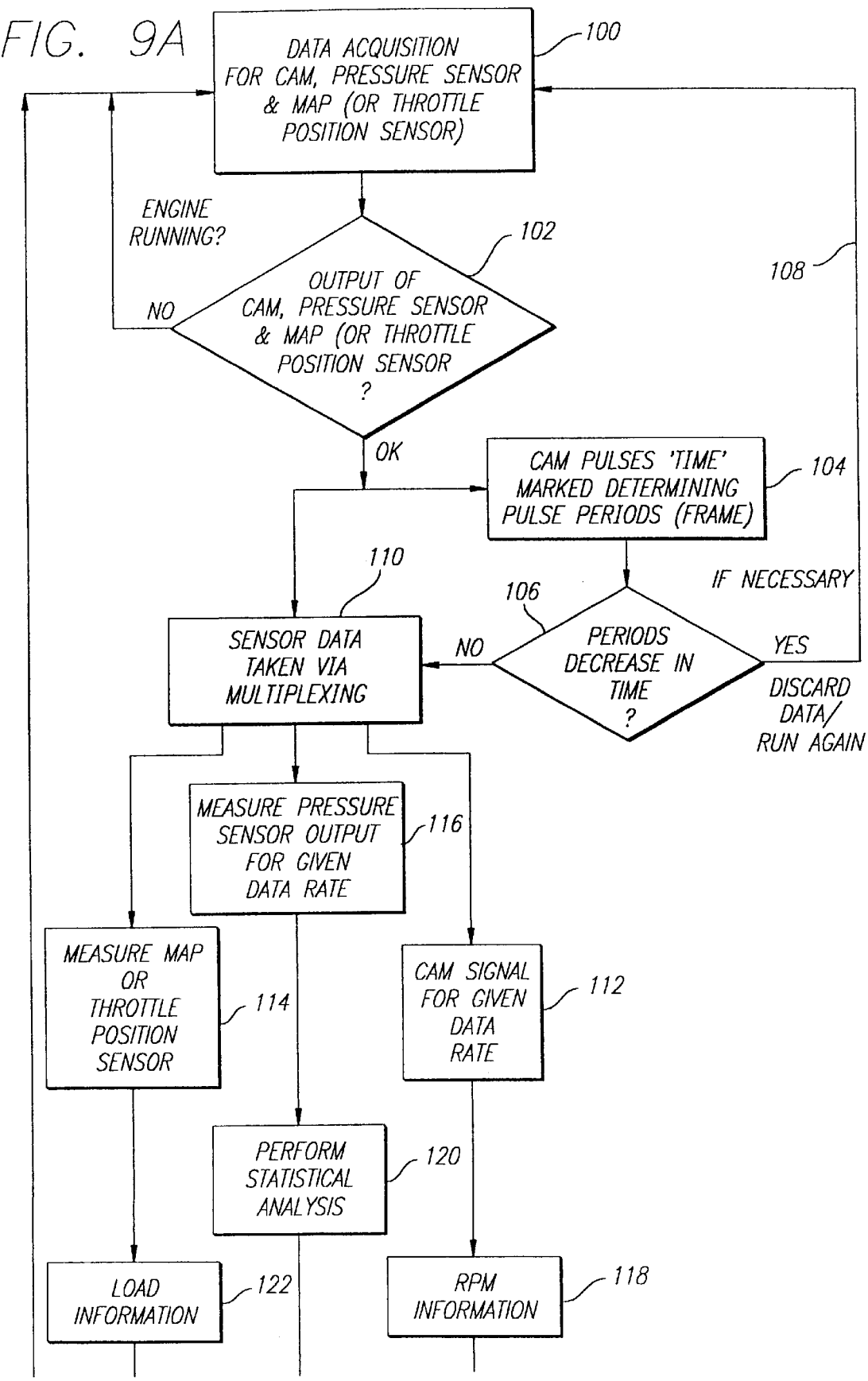

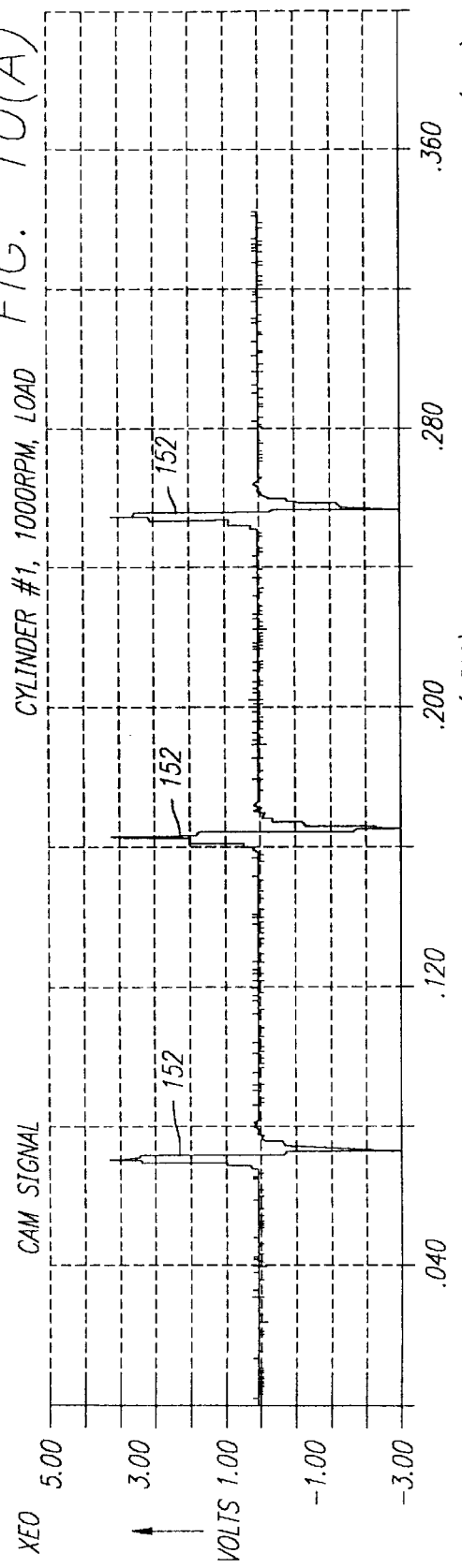
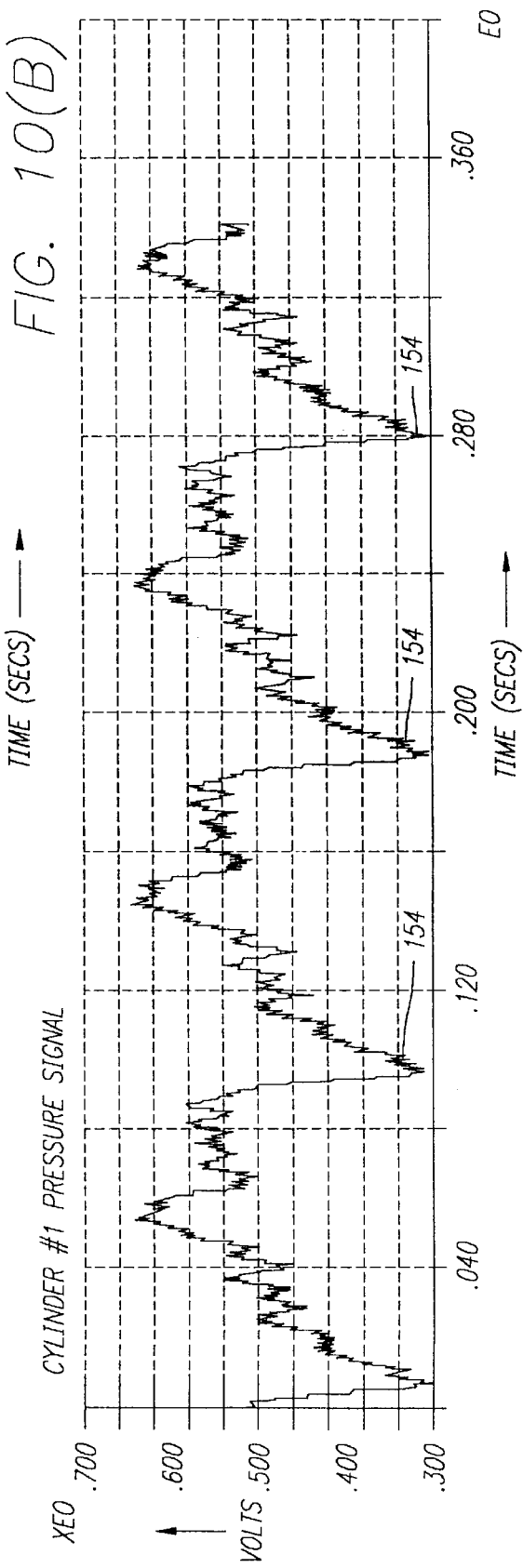
FIG. 10(A)
FIG. 10(B)

SYSTEM AND METHOD FOR MONITORING ENGINE PERFORMANCE CHARACTERISTICS

BACKGROUND OF THE INVENTION

1. Field of the Invention

The present invention relates to a system and method for monitoring engine performance characteristics and, more particularly, pertains to a system and method for monitoring occurrences of knocks in an internal combustion engine and identifying knocking cylinders of the engine.

2. Description of the Related Art

Under wide-open throttle conditions, an engine is most susceptible to knock. A direct constraint on engine performance, knock also constrains engine efficiency by limiting the engine compression ratio. Knock depends upon both the quality of fuel and the engine design.

FIGS. 11A, 11B and 11C illustrate the in-cylinder pressure variations during normal combustion, light knock, and heavy knock, respectively. With light knock (FIG. 11B), knock occurs late in the burning process and the amplitude of the pressure fluctuations is relatively small. With heavy knock (FIG. 11C), knock occurs closer to the top-center earlier in the combustion process and the initial amplitude of the pressure fluctuation is significantly higher.

Prior knock detection systems include systems employing piezoelectric pressure transducers positioned at the end-gas region of the combustion chamber. There are several problems with such systems. First, it requires a pressure sensor for each cylinder of the engine which drives up the cost and complexity of the system. Second, precise positionings of the pressure transducers within the combustion chambers are required because transducers positioned at different points in the chamber will record different pressure levels at a given time due to the shock wave propagation phenomena (caused by the spontaneous release of much of the chemical energy of the end-gas fuel) characteristic of knock.

Other prior knock detection systems employ a vibration-driven accelerometer mounted on the block of the engine. The performance of such systems, however, is plagued by a high incidence of "false knock" indications. Furthermore, the performance of such systems is highly dependent upon the placement of the accelerometer on the engine block.

SUMMARY OF THE INVENTION

A system and method for monitoring engine performance characteristics employing a single pressure sensor coupled to an exhaust manifold of the engine and a motion sensor mounted to the block of the engine, operating in parallel, has been found to detect engine knock with greater reliability than prior systems which only employ a vibration-driven accelerometer. The deficiencies of the prior systems employing a plurality of in-cylinder pressure transducers are also addressed by the system and method disclosed herein.

In this era of on-board and other vehicular diagnostic systems, it is important from a cost and complexity standpoint to reduce the number of sensors employed in such systems. The disclosed system and method is able to monitor both engine knock and engine misfiring with the same pressure sensor that is coupled to the exhaust manifold, and, thus, is also responsive to this need.

In accordance with a specific illustrative embodiment of the present invention, a system for monitoring engine performance characteristics includes a pressure sensor, a motion sensor, an engine position sensor and a processor. The pressure sensor is coupled to an exhaust manifold of an engine being monitored by the system and generates a pressure signal indicative of a pressure within the exhaust manifold. The motion sensor is operatively coupled to a block of the engine and generates an engine motion signal indicative of a movement of the engine block. The engine position sensor generates a cam signal indicative of a position of a cam shaft of the engine. The processor is programmed to process the pressure signal, the engine motion signal and the cam signal, to determine when a magnitude of the pressure signal changes in a predetermined manner, to determine when characteristics of the engine motion signal satisfy predetermined criteria, and to detect the occurrence of a knock in the engine when the magnitude of the pressure signal changes in the predetermined manner and the characteristics of the engine motion signal satisfy the predetermined criteria within a predetermined time interval.

In a further aspect of the present invention, the processor of the system is also programmed to process the cam signal to associate a cylinder of the engine with the knock and to generate a knocking cylinder identification signal which identifies the cylinder associated with the knock.

In yet a further aspect of the present invention, the system further includes a load sensor operatively coupled to the engine. The load sensor generates an engine load signal indicative of a load condition of the engine. The processor is programmed to process the pressure signal and the engine load signal to determine an occurrence of a misfire in the engine.

In another aspect of the present invention, a method for monitoring engine performance characteristics includes the steps of: providing a pressure signal indicative of a pressure within an exhaust manifold of an engine; providing an engine motion signal indicative of a movement of a block of the engine; providing a cam signal indicative of a position of a cam shaft of the engine; and employing a processor to process the pressure signal, the engine motion signal and the cam signal, to determine when a magnitude of the pressure signal changes in a predetermined manner, to determine when characteristics of the engine motion signal satisfy predetermined criteria, and to detect the occurrence of a knock in the system when the magnitude of the pressure signal changes in the predetermined manner and the characteristics of the engine motion signal satisfy the predetermined criteria within a predetermined time interval.

In a broader aspect of the present invention, a system for monitoring engine performance characteristics includes: a pressure sensor coupled to an exhaust manifold of an engine being monitored by the system with the pressure sensor generating a pressure signal indicative of a pressure within the exhaust manifold; and a processor adapted to process the pressure signal to detect an occurrence of a knock in the engine and to generate a knock indication signal.

In another aspect of the present invention, a method for monitoring engine performance characteristics includes the steps of: generating a pressure signal indicative of a pressure within an exhaust manifold of the engine; and employing a processor to process the pressure signal to detect an occurrence of a knock in the engine.

In another aspect of the present invention, a system for monitoring engine performance characteristics includes a pressure sensor and circuitry. The pressure sensor is coupled to an exhaust manifold of an engine being monitored by the system and generates a pressure signal indicative of a pressure within the exhaust manifold. The circuitry indicates a knock when a pressure pulse for a cylinder as indicated by the pressure sensor is substantially greater than a normal level for the engine operating condition, and indicates a misfire when the pressure pulse for a cylinder is substantially less than a normal level for the engine operating condition.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIG. 1 is a system for monitoring engine performance characteristics according to an exemplary preferred embodiment of the present invention;

FIGS. 9A and 9B are a flowchart showing the operation of the engine misfire detection feature of the present invention;

FIGS. 10A and 10B respectively show the engine position or CAM signal and the exhaust pressure accompanying a misfire, with both plots having the same engine conditions and time scale;

DETAILED DESCRIPTION OF THE PREFERRED EMBODIMENTS

Figure 1A:
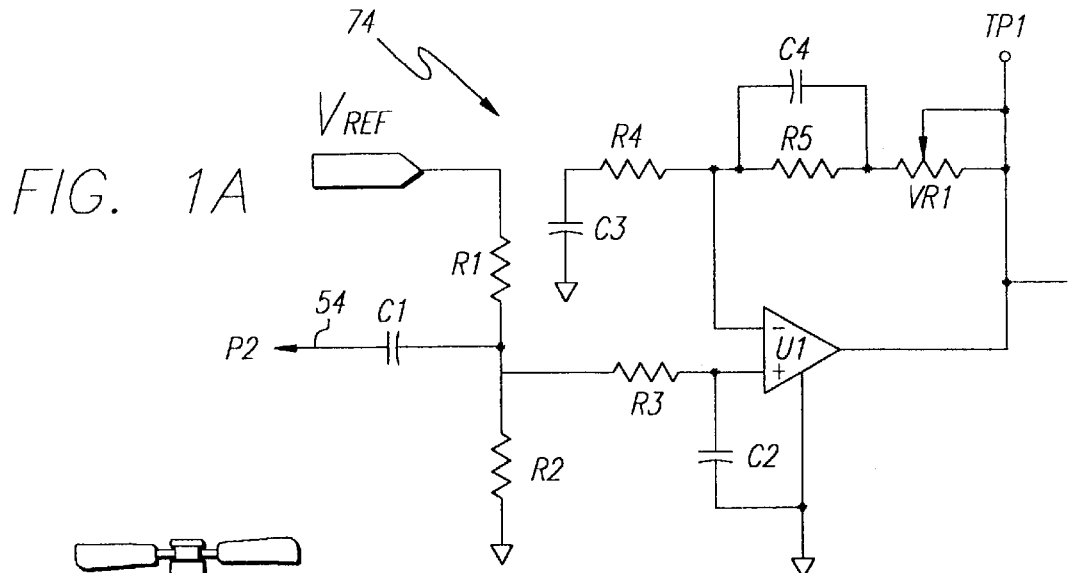
FIG. 1A is a circuit schematic of a signal filter/amplifier of the system for monitoring engine performance characteristics of FIG. 1.

FIG. 1 shows an engine 20 and a system 30 for monitoring performance characteristics of the engine. The system 30 includes a plurality of sensors for measuring various engine performance parameters. In the illustrated preferred embodiment, the plurality of sensors include an engine position sensor 32 which is operatively coupled to a camshaft of the engine 20. The engine position sensor 32 generates a cam signal on leads 34, 34' indicative of a position of the camshaft. In an exemplary preferred embodiment, the cam signal is in synchronism with revolutions of the camshaft. The cam signal can, for example, be provided in analog form on lead 34 or digitally on lead 34'. An exemplary engine position sensor 32 comprises an inductive coil sensor positioned near the engine flywheel generating an analog pulse in response to the spark plug signal. An alternative position sensor 32 comprises an optical encoder. Other methods and apparatuses for measuring the rate at which the engine's camshaft is turning and the position of the camshaft relative to the engine block are also contemplated as being within the scope of the present invention.

The plurality of sensors also includes a motion sensor 36 which is operatively coupled to the top of the block of engine 20. The motion sensor 36 comprises, for example, a conventional accelerometer, and generates an engine motion signal on lead 38 indicative of a movement of the engine block. In an exemplary preferred embodiment, the motion sensor 36 is characterized by a 120 msec response time and additionally includes conventional noise sensor and/or acoustic sensor elements.

The aforementioned sensors also include a load sensor 42 coupled to an intake manifold of the engine for providing an engine load signal on lead 44 responsive to and indicative of a load condition of the engine. The load sensor 42 measures the intake manifold pressure (manifold absolute pressure (MAP)) which is a good overall indicator of the load condition of the engine. As a greater load is applied to the engine, the pressure measured by the load sensor 42 proportionally increases. A preferred load sensor 42 is a 15 psi absolute sensor such as the Kavlico P-15 absolute pressure sensor manufactured by Kavlico Corporation of Moorpark, Calif. Alternatively, the engine load signal on lead 44 may be generated by providing a throttle position sensor.

The system 30 additionally includes a pressure sensor 52 coupled to an exhaust manifold of the engine 20. The pressure sensor 52 generates a pressure signal on lead 54 indicative of a pressure within the exhaust manifold. Preferably, the pressure sensor 52 comprises a ceramic variable capacitive pressure sensor, e.g., 5 psig, 10 msec response time, at 1 time constant. The pressure sensor 52 may be of the type described for example in U.S. Pat. No. 4,388,668, granted Jun. 14, 1983, and assigned to the Assignee of the present application.

The pressure transducer includes two disks of ceramic material, and in one operative embodiment, the disks are approximately 1.27 inches in diameter and the diaphragm is approximately 14.5 thousandths of an inch thick. The two ceramic disks are preferably spaced apart by glass frit by a relatively small distance such as a few thousandths of an inch, and they have space conductive plates on their inner surfaces, which form a capacitor. As the diaphragm is flexed with pressure changes, the capacitance of the spaced plates changes.

A small printed circuit board employs the changes in capacitance to generate a varying electrical signal transducer output. A typical circuit employed for the aforementioned purpose is disclosed in U.S. Pat. No. 4,398,426, granted Aug. 16, 1983, and assigned to the Assignee of the present invention. Such transducers are also available from Kavlico Corporation of Moorpark, Calif., as 10 psi pressure transducers.

As shown in FIG. 1, the engine monitoring system 30 also includes electronics 60 which receive and process the signals on leads 34, 38, 44, 54. Exemplary preferred electronics 60 comprise a controller or processor 62, a clock 64, a read only memory (ROM) 66, a random access memory (RAM) 68, an A/D converter 70, a multiplexer 72, and a signal filter/amplifier 74.

A key aspect of the present invention is that the engine monitoring system 30 employs a single pressure sensor 52 coupled to an exhaust manifold of an engine and a motion sensor 36 mounted to the block of the engine, operating in parallel, to detect engine knock. Another key aspect of the present invention is that a preferred embodiment of the system 30 is adapted to monitor both engine knock and engine misfiring with the same pressure sensor 52 that is coupled to the exhaust manifold and identifies individual knocking or misfiring cylinders.

Thus, and again referring to FIG. 1, a preferred engine monitoring system 30 further comprises a display unit 81 which receives a signal 83 identifying a knocking cylinder of the engine when a knock condition is detected. For a V-8 engine, the display unit 81 includes eight knock indicators 85 corresponding to the eight cylinders of the engine. A similar display unit 80 receives a signal 82 identifying a misfiring cylinder of the engine when a misfire condition is detected by the system 30. The display unit 80 for a V-8 engine includes eight misfire indicators 84 corresponding to the eight cylinders of the engine. The indicators 84, 85 may, for example, comprise red light emitting diodes (LED) or any other suitable visible and/or audible indicator which identifies a knocking/misfiring cylinder to the mechanic performing a diagnostic check of the engine, a driver of the vehicle, etc. The display units 80, 81 may, but do not necessarily, include a normal/engine OK indicator 86 such as a green LED, for example.

As may be readily appreciated, other display configurations are contemplated. For instance, the display units 80, 81 could be assembled within a single display unit.

Consistent with the goal of providing a system 30 with flexible diagnostic capabilities, the electronics 60 also include accessible terminals for measuring voltages of interest such as terminals 88, 90 which respectively allow a technician to monitor the cam signal on lead 34 and a filtered pressure sensor signal with an oscilloscope 92, for example.

As shown in FIG. 1, the processor 62 and the A/D converter 70 receive timing signals from the clock 64. The processor 62, in turn, controls the multiplexer 72 which receives the cam signal, motion signal, pressure signal and load signal. Where the engine position sensor 32 is an optical encoder or other device generating a digital cam signal 34', such an output signal may be provided directly to the processor 62 as shown. Additionally, a signal filter/amplifier 74 is provided between the pressure sensor 52 and the multiplexer 72.

Components of the signal filter/amplifier 74 (FIG. 1A) are appropriately selected to filter out any undesired noise and such that an unacceptably high amount of propagation delay is not introduced into the signal path.

The processor 62 is electrically connected to ROM 66 via a read-only interconnect as is known in the art. RAM 68 conventionally interfaces to the processor 62 via a read/write interface. A program to be executed by the processor 62 may be stored in either the ROM 66 or the RAM 68.

Figure 11C:
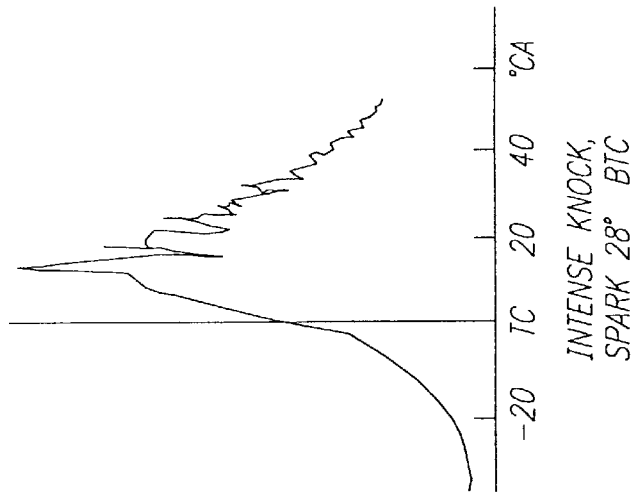
FIGS. 11A, 11B and 11C illustrate the in-cylinder pressure variations during normal combustion, light knock, and heavy knock, respectively.
Figure 11B:
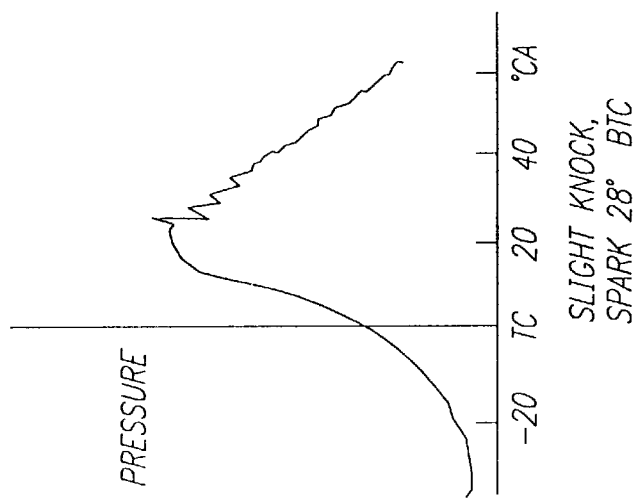
Figure 11A:
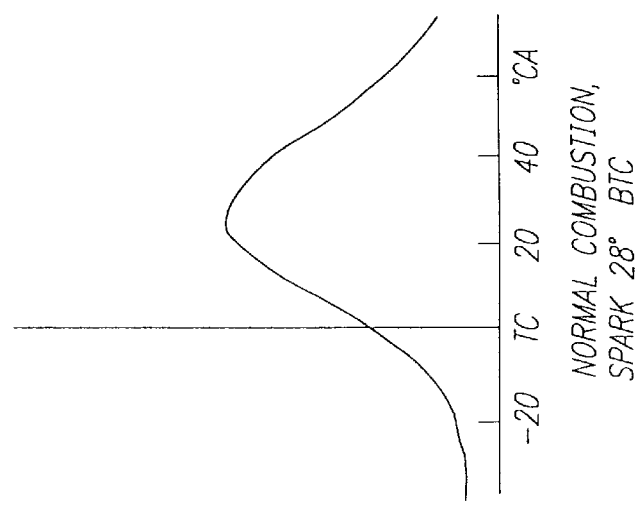

Generally, the system and method for monitoring engine performance characteristics disclosed herein pertain to a knock detection feature, a misfire detection feature, or a combination of these features. With regard to the knock detection aspect, FIGS. 11A, 11B and 11C illustrate typical in-cylinder pressure variations during normal combustion, light knock, and heavy knock, respectively. While the pressure at the exhaust manifold is not identical to the pressure within the cylinders, it has been observed that a sharp rise in the pressure measured by the pressure sensor 52 is a good indicator of knock. Accordingly, the processor 62 is programmed to process the pressure signal to detect an occurrence of a knock in the engine when the magnitude of the pressure signal changes in a predetermined manner which has been empirically observed to correspond to an observed and verified knock event. A particular advantage of the present invention, with the pressure sensor 52 simply coupled to the exhaust manifold, is that it eliminates the requirement in some prior systems of precisely positioning a plurality of pressure transducers within the engine's combustion chambers.

In a more refined embodiment, the processor 62 is programmed to effect the knock detection feature by processing both the pressure signal and the engine motion signal. In this embodiment, the processor 62 is also programmed to determine when a magnitude of the pressure signal changes in a predetermined manner, to determine when characteristics of the engine motion signal satisfy predetermined criteria, and to detect the occurrence of a knock in the engine 20 when the magnitude of the pressure signal change in the predetermined manner and the characteristics of the engine motion signal satisfy the predetermined criteria within a predetermined time interval. Exemplary predetermined criteria are met when the difference between knock and noise measured by the motion sensor 36 and its noise sensor exceeds a predetermined threshold. It has been observed that such a system, which provides a knock indication only when the processed pressure and engine motion signals both indicate an occurrence of a knock event, generates fewer false indications of knock than prior knock detection systems which employ only a vibration-driven accelerometer mounted on the block of the engine.

Preferably, the processor 62 is also programmed to process the cam signal to associate a cylinder of the engine 20 with the knock and to generate the knocking cylinder identification signal 83 which identifies the cylinder associated with the knock.

Figure 12A:
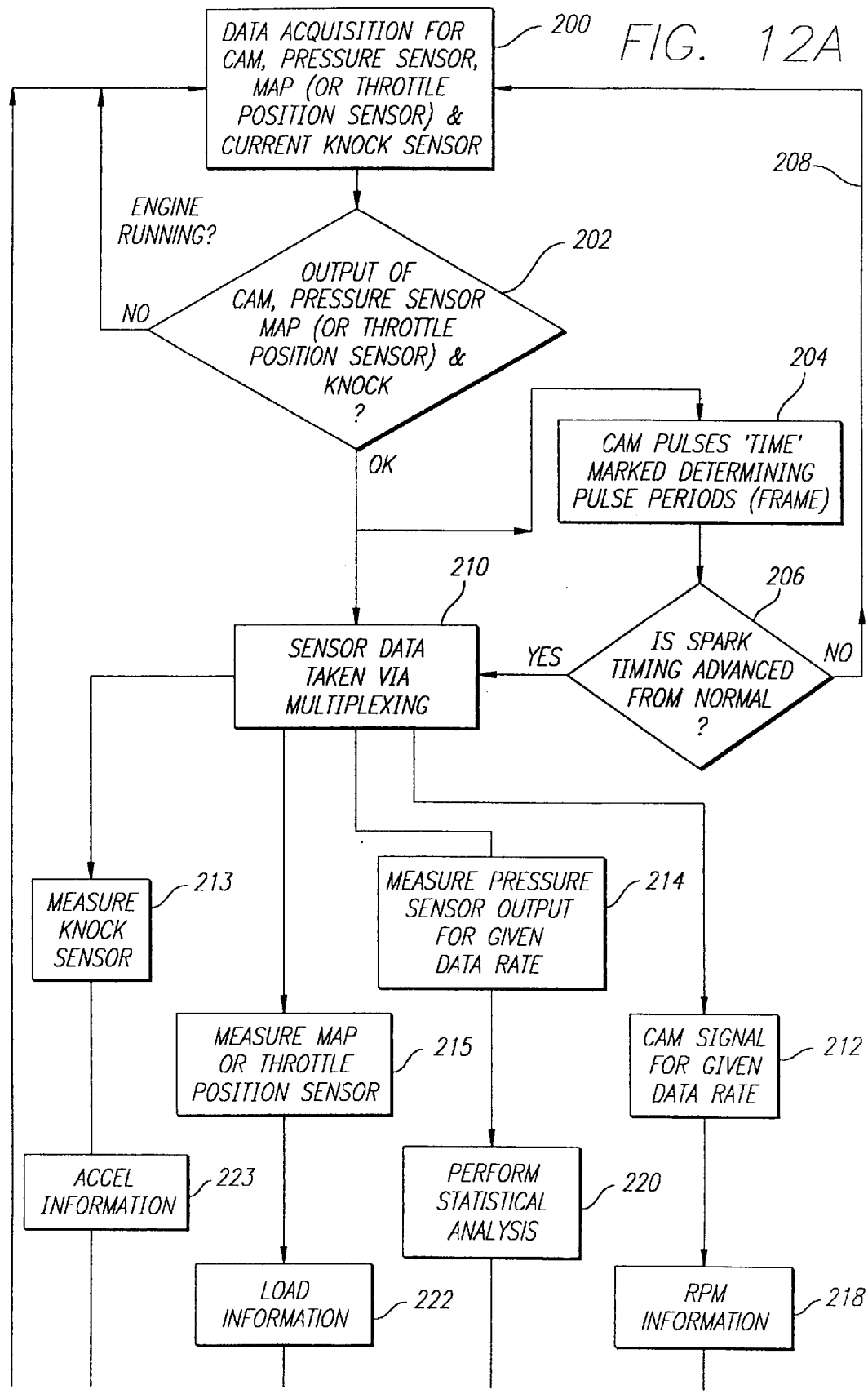
FIGS. 12A and 12B are a flowchart showing the operation of the engine knock detection feature of the present invention.
Figure 12B:
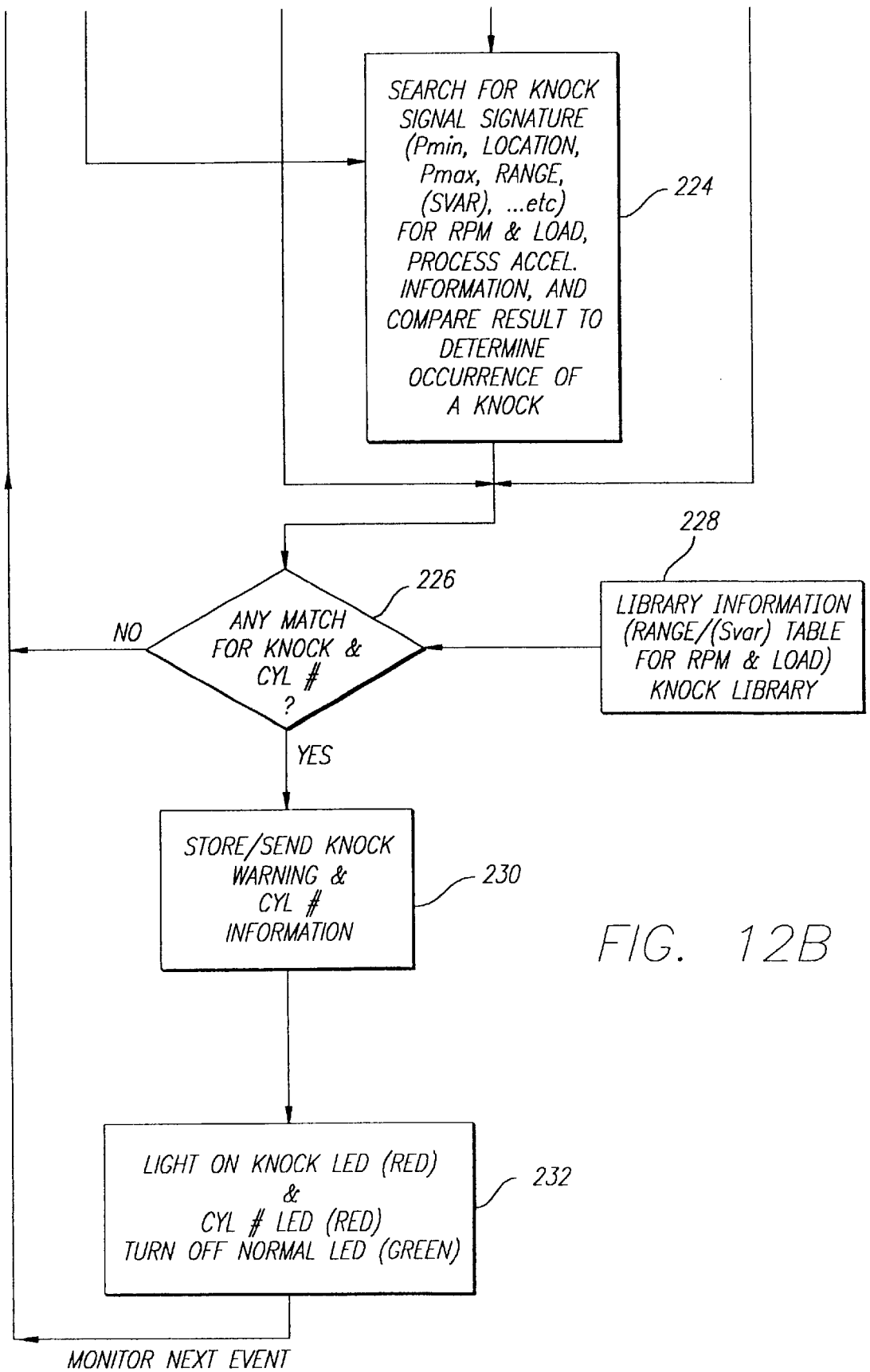

The electronics 60 are programmed to implement the knock detection aspect according to a program such as the one represented in the flow chart of FIGS. 12A and 12B. The program begins at block 200 wherein the cam signal, motion signal, load signal, and pressure signal are received in digital form into the processor 62. After the processor 62 verifies at 202 that the engine is running and that the inputs are present, block 204 and diamond 206 reset the system along line 208 if the spark timing is not advanced from normal. Block 210 represents the combined functions of the multiplexer 72 and the A/D converter 70 which provide the signals on leads 34, 38, 44, 54 to blocks 212, 213, 214, 215, respectively. As discussed above, the cam signal provides engine rate (or RPM) information at block 218 depending upon the distance between successive cam pulses. Block 220 is an optional statistical analysis processing stage, the details of which are described below in greater detail with reference to block 120 of FIG. 9A and incorporated herein. Block 222 of FIG. 12A reflects that the load signal corresponds to the present engine load condition. Block 223 reflects that the motion signal corresponds to a movement of the engine block.

FIG. 12B illustrates at block 224 a knock condition detection technique wherein the engine motion signal and the pressure signal are processed and compared as discussed above. Block 224 additionally (and optionally) provides that samples of the pressure signal are compared to stored empirical data taken under normal engine operating conditions. The comparison with stored empirical data is described below with reference to block 124 of FIG. 9B and incorporated herein.

After a knock condition is detected, the processor 62 at 226 of FIG. 12B attempts to identify which particular cylinder has knocked. A preferred system 30 additionally is programmed to include block 228 which provides correction information as discussed below in greater detail with reference to block 128 of FIG. 9B and incorporated herein.

If a knock match is found, blocks 230, 232 of FIG. 12B indicate that the processor 62 may be programmed to actuate the appropriate knock indicator 85 of the display unit 81 (FIG. 1).

Figure 13:
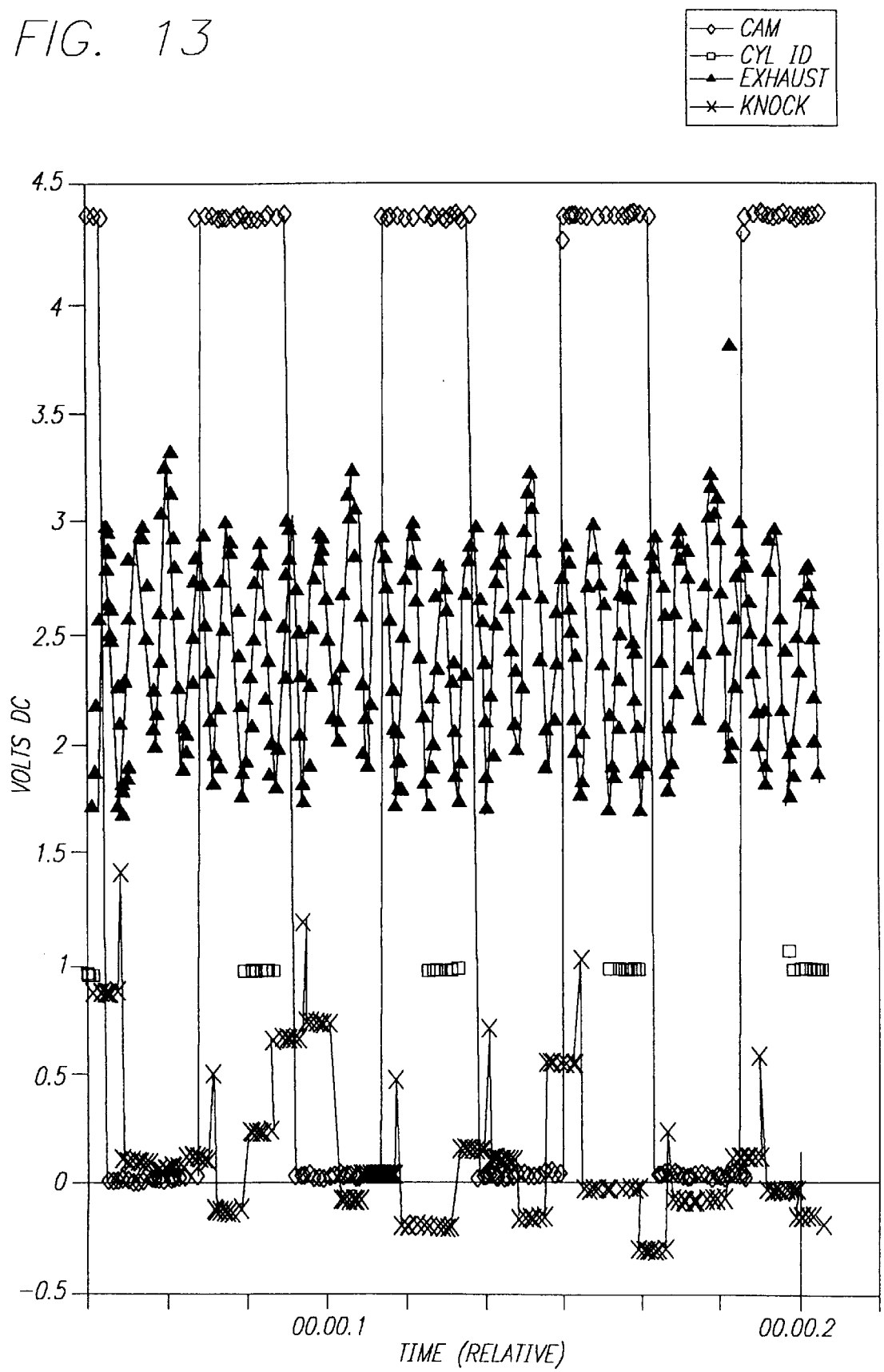
FIG. 13 is a plot showing sensor outputs of the system for monitoring engine performance characteristics of FIG. 1 over time for a 6 cylinder engine at 0 degrees, 3,000 rpm, and 400 mg load.
Figure 14:
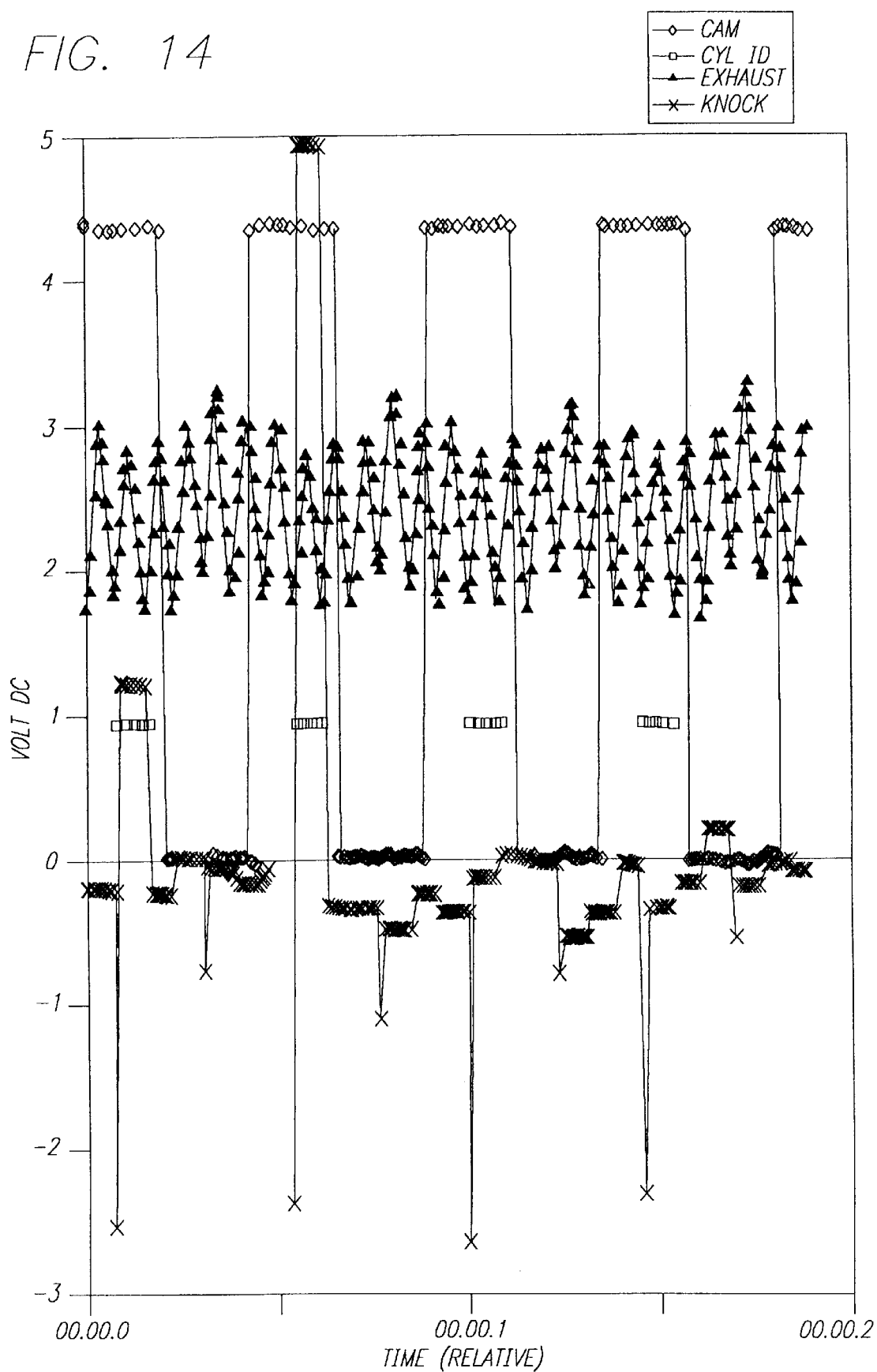
FIG. 14 is a plot showing sensor outputs of the system for monitoring engine performance characteristics of FIG. 1 over time for a 6 cylinder engine at 8 degrees, 3,000 rpm, and 400 mg load.

FIG. 13 is a plot showing observed sensor outputs of the system 30 over time for a 6 cylinder engine at 0 degrees, 3,000 rpm, and 400 mg load. FIG. 14 is a plot showing observed sensor outputs of the system 30 over time for a 6 cylinder engine at 8 degrees, 3,000 rpm, and 400 mg load.

Figure 2:
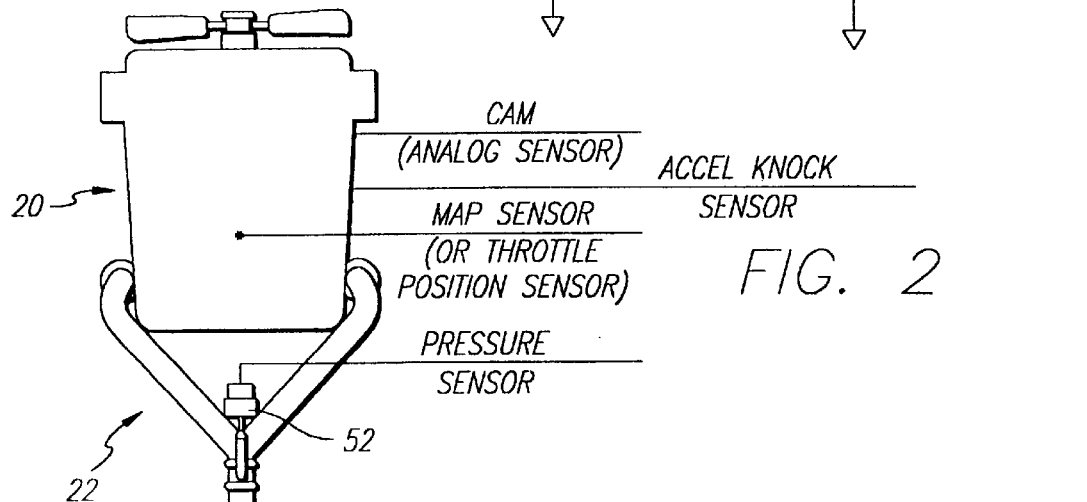
FIG. 2 is a partial cross-sectional view of an engine and its exhaust manifold with a pressure sensor coupled thereto.
Figure 3:
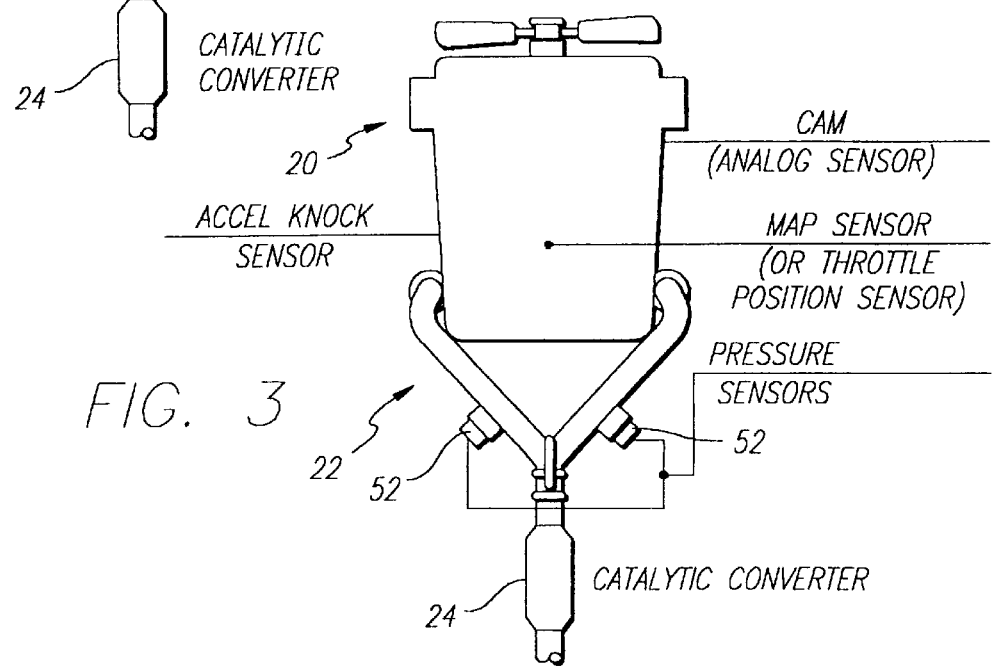
FIG. 3 is a partial cross-sectional view of an engine and its exhaust manifold with two pressure sensors coupled thereto.
Figure 4:
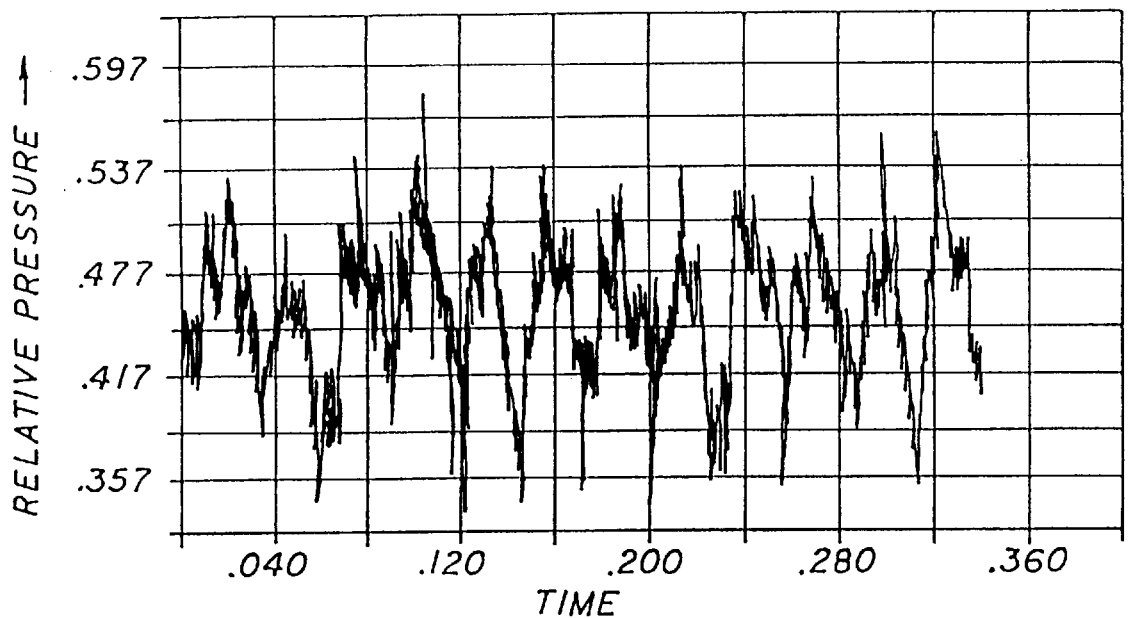
FIG. 4 is a plot of a misfire sensor signal provided by the misfire sensor of FIG. 2 under normal engine operating conditions.
Figure 5:
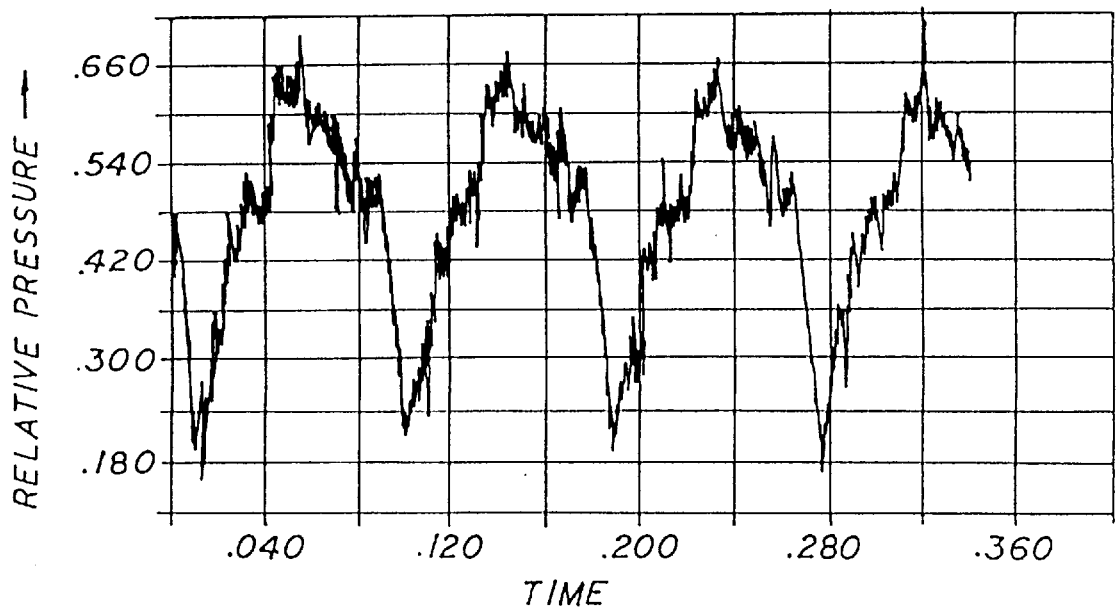
FIG. 5 is a plot of a misfire sensor signal provided by the misfire sensor of FIG. 2 during a misfire condition of the engine.

Turning to the misfire detection aspect of the present invention—where the system 30 detects and identifies misfiring engine cylinders under varying engine cycle rates and varying engine load conditions in real time—one or several pressure sensors 52 may be included in the detection system 30 as shown in FIGS. 1–3. Pressure sensors employed for misfire detection are preferably coupled to the exhaust manifold system 22 "upstream" of the catalytic converter 24 with each sensor 52 being positioned substantially equidistantly from the engine block. The system 30 detects a misfire condition when the pressure signal is determined to be outside a range of values which have been empirically determined to be acceptable for the present operating speed and load condition of the engine. A misfire condition is characterized by a sharp decrease in the pressure in the exhaust manifold system 22. If the voltage of the pressure signal falls below the aforementioned acceptable range of values, for example, the system 30 detects a misfire condition. FIGS. 4 and 5 show the pressure signal on lead 54 under normal operating conditions and under a misfire condition, respectively. The sharp periodic dip in the voltage plot shown in FIG. 5 is indicative of a misfiring engine cylinder which causes the pressure in the exhaust manifold system 22 and thus the voltage of the pressure signal on lead 54 to decrease.

The "upstream" positioning of the pressure sensor 52 in the exhaust manifold system 22 relative to the catalytic converter 24 also allows the system 30 to detect an unacceptably high increase in the pressure measured within the exhaust manifold system 22 which may, for example, be caused by a blockage in the catalytic converter 24. As before, the system 30 utilizes the empirically determined range of misfire sensor signal values which are known to be acceptable under normal operating conditions (when the engine is operating at a particular rate and under a particular load condition) to determine if the pressure in the exhaust manifold system 22 is unacceptably high. The pressure signal may also be employed by the system 30 to provide noise control for the engine's exhaust system.

It has been observed that the pressure and resultant output voltage of the pressure sensor 52 varies depending upon the rate at which the engine is running and upon the load applied to the engine. Under normal operating conditions, ranges of pressure signal values may be measured and used by the electronics 60 to determine when the pressure in the exhaust manifold system 22 is inappropriately high or low at a particular engine speed and load condition. The processor 62 which, for example, comprises a MC68HC11 type controller manufactured by Motorola Corporation serves several functions. First, the processor 62 receives and utilizes the pressure signal via lead 54 to determine whether a misfire has occurred in any of the cylinders during a particular cycle of the engine. The beginning and end of an engine cycle are respectively designated by two consecutive output pulses of the cam signal at lead 34. Second, the processor 62 monitors the range of the pressure signals received during a frame of data, (i.e., the range of all pressure signals sampled by the processor 62 between consecutive cam pulses). The difference between the maximum voltage and minimum voltage ($P_{max}$ and $P_{min}$, respectively) of the pressure signals at lead 54 detected during such a time interval provides a range signal (RANGE) corresponding to a particular engine cycle. Thus, a lowest peak value ($P_{min}$) is measured and a range (RANGE) of the pressure signal at lead 54 is calculated by the processor 62 during an engine cycle and used to detect a misfire condition occurring during that particular cycle in real time by comparing these values to empirically derived misfire signal signatures. The system 30 provides a simplified detection scheme which does not require but may utilize statistical processing techniques.

Figure 6:
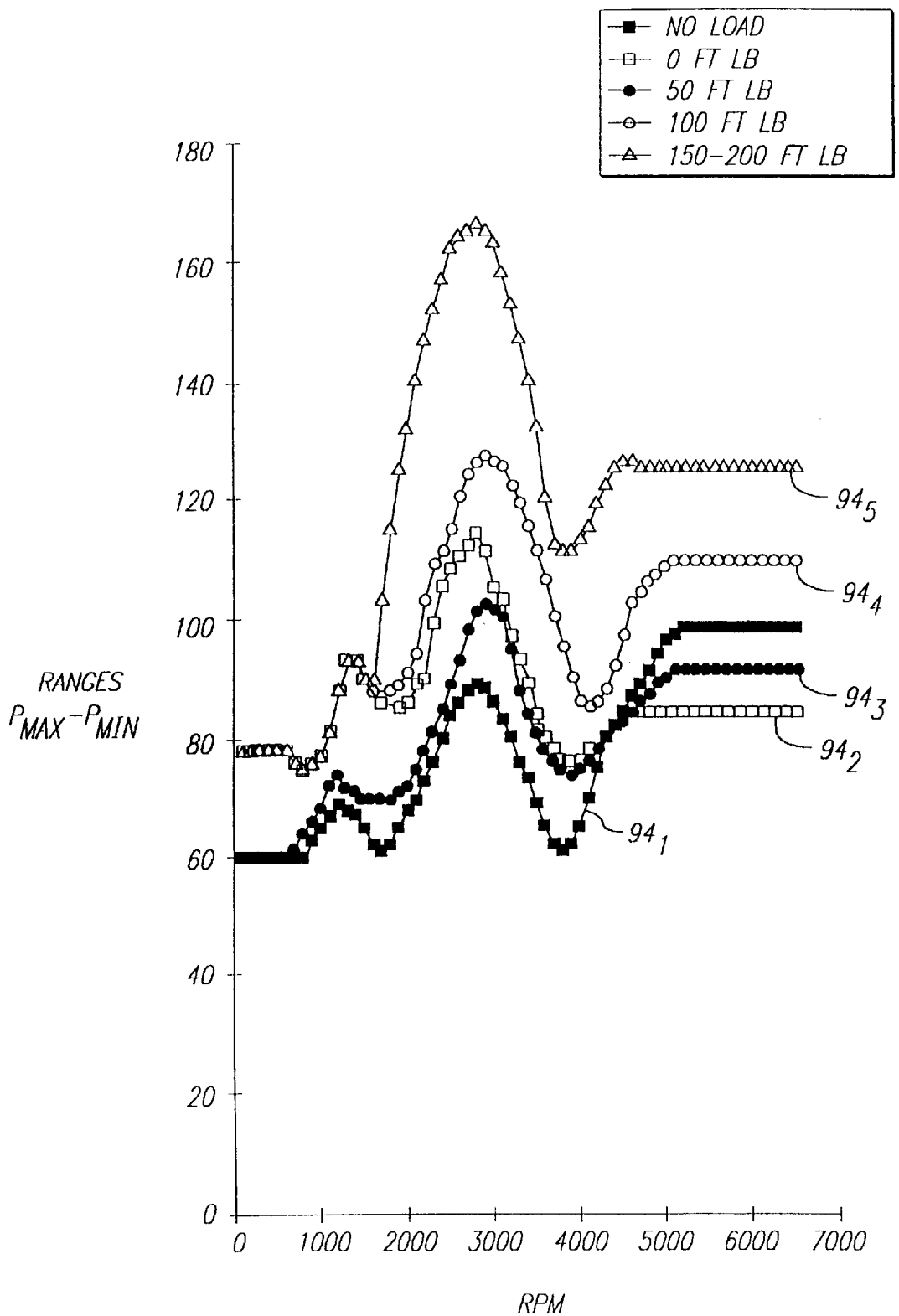
FIG. 6 shows plots of misfire sensor signal range data over different engine rates and under different engine load conditions.

FIG. 6 shows a group of misfire signal signatures or characteristics which illustrate the observed range, maximum minus minimum pressures of the pressure signal at lead 54 plotted against the rate at which the engine is running; each of the misfire signal plots corresponding to a different load condition of the engine. When no load is applied to the engine, the misfire signal signature $94_1$ of solid square data points plots observed normal operating condition pressure signal range values along the vertical axis against the rate of the engine along the horizontal axis. Under a "light load" condition (e.g., the engine is idling with the air conditioner on) the misfire signal signature $94_2$, of hollow square data points was observed. Similarly, the misfire signal signatures $94_3$, $94_4$, $94_5$ show the correlation between normal operating condition pressure signal range values and different cycle rates of the engine as observed at a 50 ft-lb, 100 ft-lb, and 150–200 ft-lb load condition of the engine. The misfire signal characteristics 94 are stored in a suitable memory device accessible by the processor 62, such as the ROM 66 or the RAM 68 (FIG. 1).

Real time processing is difficult utilizing prior art techniques which require data to be collected for at least an entire frame for averaging and which utilize computationally intensive calculations such as square root operations. The processor 62 may alternatively employ a predicted average scheme thereby eliminating some of the burdens associated with statistical processing techniques.

Referring to FIG. 1A, the signal filter/amplifier 74 receives the pressure signal at lead 54 and removes any direct current signal component therefrom. The amplifier U1 provides a filtered, alternating current component of the pressure signal 54 to the processor 62 which uses this output of U1 to obtain the RANGE, Pmin and Pmax values for each engine cycle. The reference voltage $V_{REF}$ is a conventional power supply voltage at +5.0 Vdc, for example.

It has been additionally observed that the voltage $V_{REF}/2$ provides a good approximation of an average of the AC component of the pressure signal at lead 54 which is used in the standard variance of the average (SVAR) calculation, discussed below. When analog circuit components such as those illustrated in FIG. 1A are selected, the gain of the operational amplifier U1 is set very precisely, thereby allowing the foregoing predicted average scheme to be employed in lieu of more involved statistical calculations.

Figure 7:
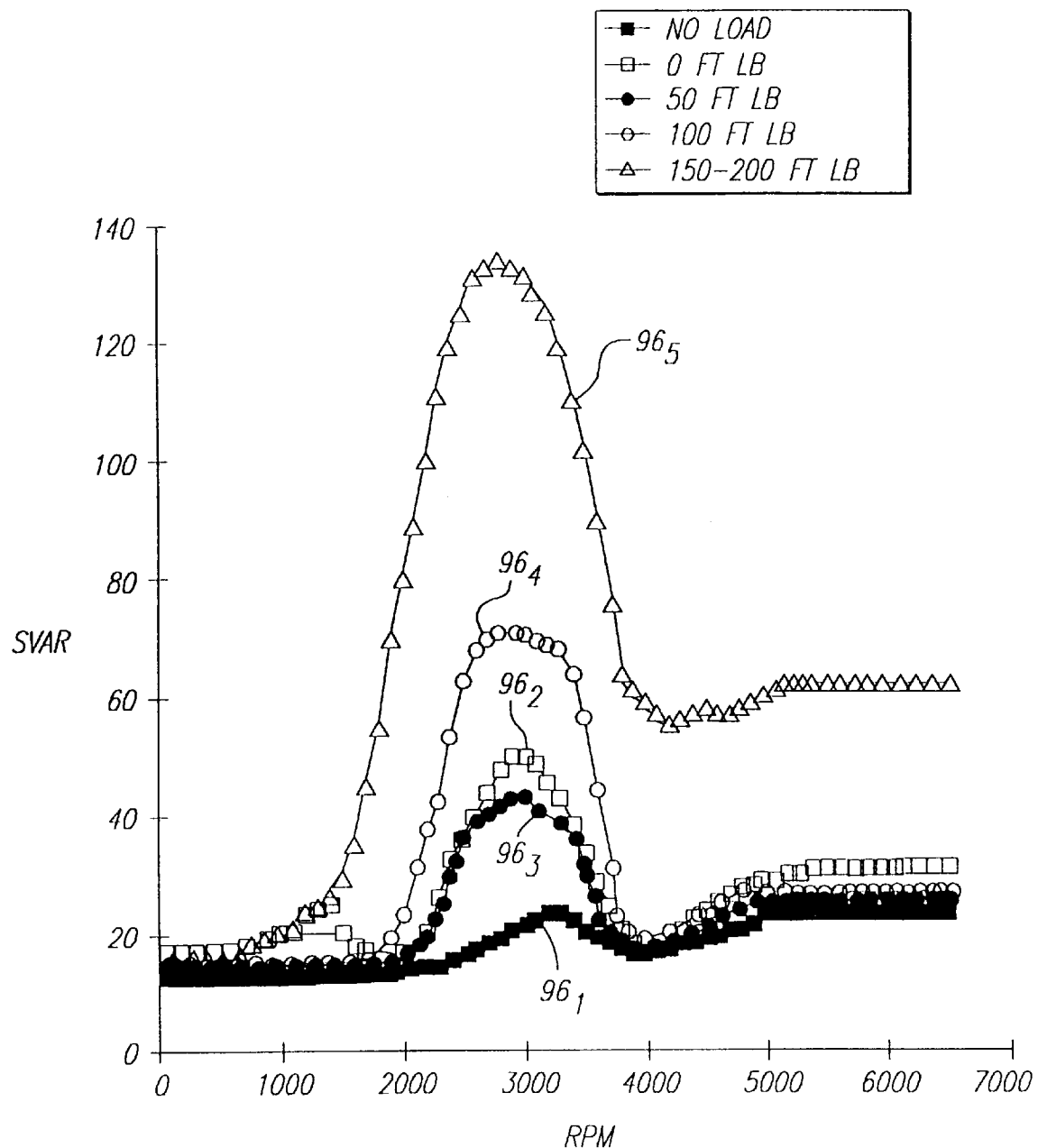
FIG. 7 is a plot of standard variances of the average of the misfire sensor signal over different engine rates and under different engine load conditions.

If the electronics 60 and the processor 62, in particular, have sufficient processing capability, then the processor 62 may also be programmed to calculate a standard variance of the average (SVAR) of the pressure signal at lead 54 in real time in making the misfire determination. As with the plots of the misfire signal characteristics, FIG. 7 shows that the standard variance of the average of the pressure signal at lead 54 over different engine speeds differs under different engine load conditions. More specifically, FIG. 7 shows SVAR signatures or characteristics $96_1$, $96_2$, $96_3$, $96_4$, $96_5$ which respectively correspond to calculated SVARs over engine rate as observed under a no load condition, a "light load" condition, 50 ft-lbs, 100 ft-lbs, and 100–200 ft-lbs. As with the misfire signal characteristics 94, the SVAR characteristics 96 may also be stored in a memory device such as the ROM 66 or the RAM 68. Tables 1 and 2 which follow form a part of this patent application and respectively include the observed data points plotted in FIGS. 7 and 8. One text describing statistical analysis techniques which may be employed in a preferred implementation of the present invention is "Numerical Recipes in C" or "The Art of Scientific Computing," 2nd Ed., by William H. Press, et al., Cambridge University Press.

If a rate at which the processor 62 samples the pressure signal remains constant over varying engine rates, the resolution of the sample data necessarily decreases as rotations per minute (RPM) of the engine increase. Accordingly, the present invention may include increasing a sample rate of the processor 62 as the speed of the engine increases in RPMs.

Figure 8:
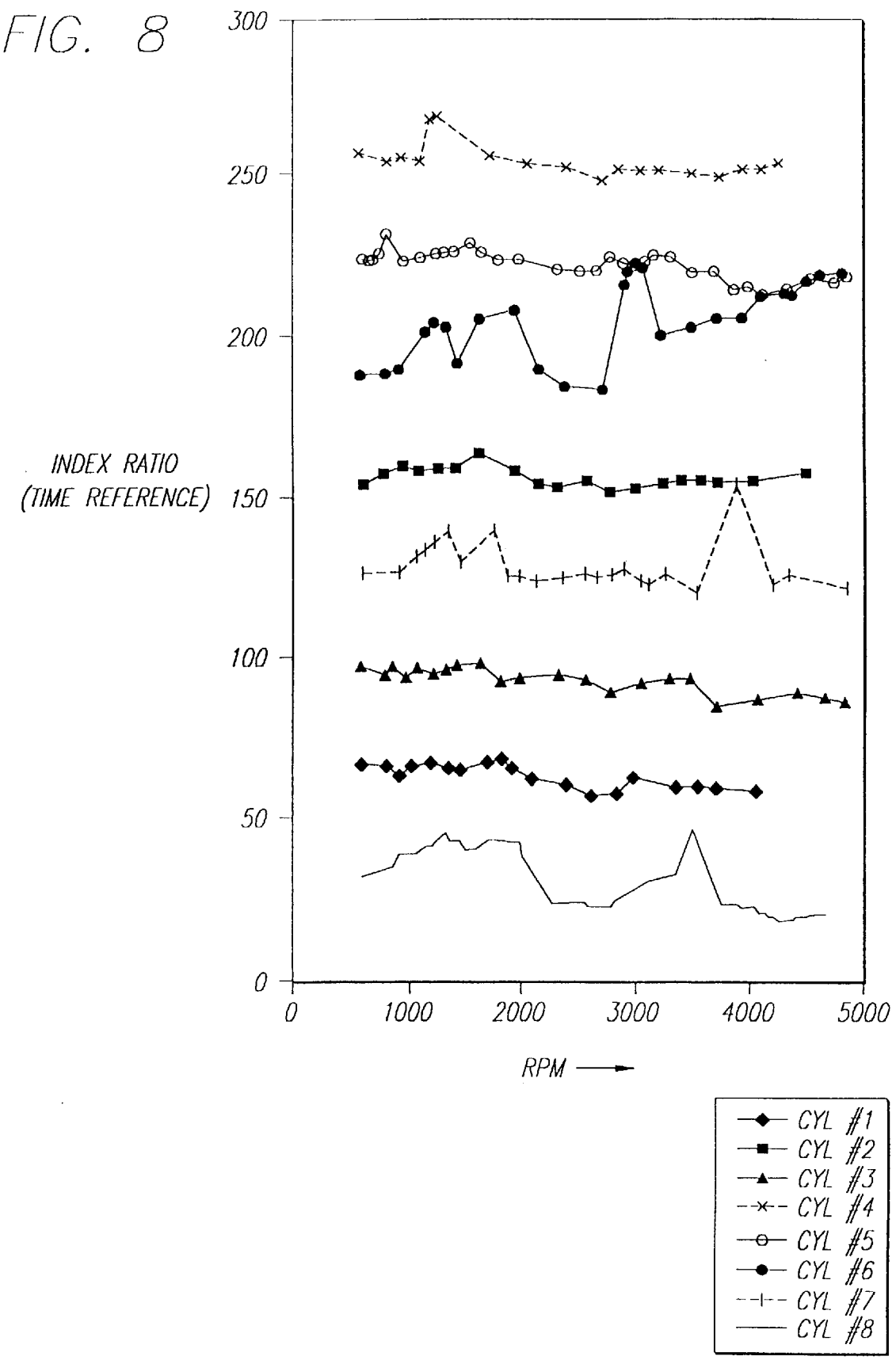
FIG. 8 is a plot of corrected index ratios for each cylinder of a V-8 style engine where 360 samples per frame were taken by a processor implementing the engine misfire detection feature of the present invention and where the engine was subjected to a 50 ft-lb load.

Successive cam pulses serve as reference points for a beginning and an end of a single engine cycle during which all cylinders fire once. Since the cylinders of an engine fire in a predefined order, the cam pulses serve as reference points in time where the processor 62 begins and ends sampling the pressure signal at lead 54 for a particular engine cycle. When different cylinders of an engine misfire, the observed pressure minimum in the pressure signal at lead 54 appears at different positions within the frame. However, the time intervals between the pressure decreases of successively misfiring engine cylinders are not necessarily equally spaced. In fact, as indicated in FIG. 8, it has been observed that the lowest peak values of the pressure signal at lead 54, for each of the different cylinders when misfiring, are not equally spaced in time from one successive misfiring cylinder to the next, varying in position within the frame depending upon the rate of the engine and the load applied thereto. However, it may be seen that the timing of the successive cylinder misfiring points as indicated in FIG. 8 is generally sequential with minor variations at different engine speeds.

After the misfire detection system electronics 60 have detected a misfire condition, the processor 62 utilizes an index ratio to determine which cylinder misfired. The index ratio is determined from the rate that the engine is operating at and from the number of samples of the pressure signal at lead 54 taking during the engine cycle for which a misfire condition has been detected. The index ratio correlates the pressure signal at lead 54 with the cam signal at lead 34 to generate a signal identifying a misfiring cylinder of the engine after a misfire condition is detected. More specifically, the index ratio is determined by dividing the number of sample intervals between the cam signal and the occurrence of the pressure minimum point $P_{min}$, by the total number of sample intervals between successive cam signals.

The accuracy with which the processor 62 identifies a particular misfiring cylinder is enhanced by adjusting the index ratio with index ratio correction information which compensate for the effects of different engine cycle rates and varying engine load conditions on the position of $P_{min}$ relative to the cam pulses. FIG. 8 shows corrected index ratios for each cylinder of a V-8 style engine where 360 samples per frame were taken by the processor 62 and where the engine was subjected to a 50 ft-lb load. In FIG. 8, the 360 samples were rescaled to 256 data points. The corrected index ratios for each cylinder are plotted over engine speed and have been adjusted by the index ratio correction information which compensate for the effects of different load conditions. The index ratio correction information may be stored in a memory device such as the ROM 66 or the RAM 68. Table 3 which follows forms a part of this patent application and includes the observed data points plotted in FIG. 8.

Figure 9B:
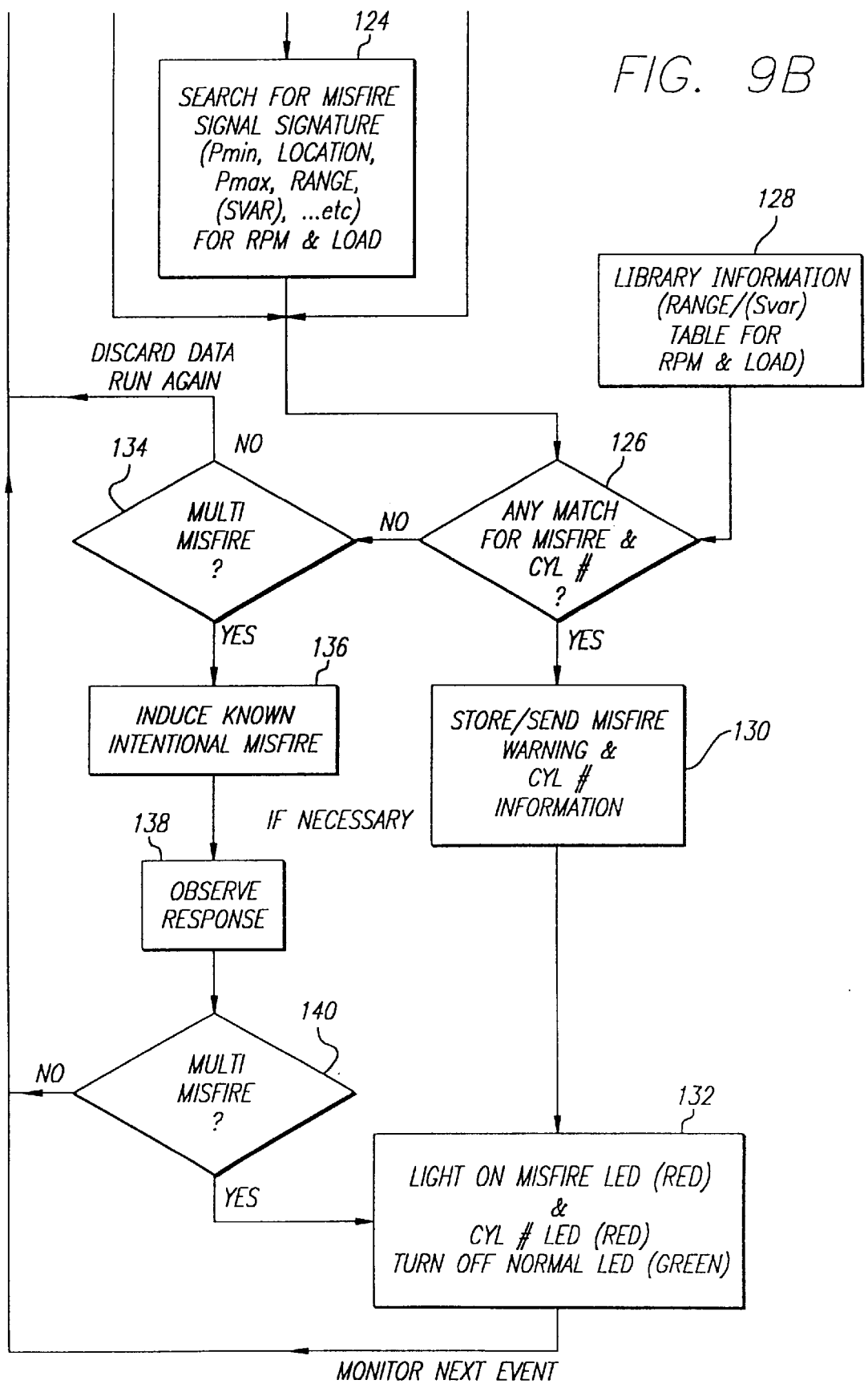

The electronics 60 are programmed to implement the misfire detection aspect of the present invention according to a program such as the one represented in the flow chart of FIGS. 9A and 9B. The program begins at block 100 wherein the cam signal, the load signal, and the pressure signal are received in digital form into the processor 62. After the processor 62 verifies at 102 that the engine is running and that the inputs are present, block 104 and diamond 106 reset the system along line 108 since decreasing periods between successive cam pulses indicate a deceleration of the engine during which some misfires are to be expected. Block 110 represents the combined functions of the multiplexer 72 and the A/D converter 70 which provide the signals on leads 34, 44, 54 to blocks 112, 114 and 116 respectively. As discussed above, the cam signal provides engine rate (or RPM) information at block 118 depending upon the distance between successive cam pulses. If the processor 62 employs the above described statistical analyses, block 120 represents, for example, a SVAR calculation of the pressure signal. Block 122 reflects that the load signal corresponds to the present engine load condition.

FIG. 9B illustrates at block 124 the aforedescribed misfire condition detection technique wherein samples of the pressure signal are compared to stored empirical data taken under normal engine operating conditions. After a misfire condition is detected, the processor 62 at 126 attempts to identify which particular cylinder has misfired. The index ratios are adjusted with the stored index ratio correction information as represented in block 128. If a misfire match is found, blocks 130, 132 indicate that the processor 62 may be programmed to actuate the appropriate misfire indicator 84 of the display unit 80 (FIG. 1). If no match is found for a single cylinder misfire, the processor 62 may also be programmed at 134 to determine via statistical analyses whether there is a multi-cylinder misfire condition. Furthermore, optional blocks 136, 138, 140 reflect that the program which is executed by the processor 62 may also include a variety of self-tests or diagnostic features for the engine misfire detection system 30.

FIG. 10A shows the cam signal, with the successive pulses 152 occurring each time the no. 1 cylinder reaches top dead center. FIG. 10B shows a misfiring condition, with the minimums 154 representing the reduced pressure points associated with the misfiring of the same cylinder during successive engine cycle intervals. The misfiring cylinder may be identified, as discussed above, by determining the ratio of the time from one cam signal 152 to the next minimum point 154, and dividing this value by the time between successive cam pulses.

It should be understood that the principles set forth above are also applicable with appropriate modifications to knock detection and have been omitted in the interest of economy. Although FIGS. 9 and 12 show separate logical flows for knock and misfire detection, the scope of the present invention contemplates programming the processor 62 such that the knock detection and misfire detection protocols are executed together, e.g., parallel processing, multiplexed routines, etc.

Those skilled in the art will appreciate that various adaptations and modifications of the just described preferred embodiment can be configured without departing from the scope and spirit of the invention. Thus, the principles of the invention may be alternatively implemented by an analog or "hard-wired" circuit, preferably using comparison and reference voltage values which vary with engine speed and load. It is also contemplated that the positioning of the pressure sensor may be changed to other areas within an internal combustion engine or within the exhaust system of the engine. For example, a plurality of pressure sensors may be positioned each within separate exhaust manifolds. Other types of accelerometers and pressure sensors may be applied depending upon the application. Therefore, it is to be understood that, within the scope of the appended claims, the invention may be practiced other than as specifically described herein.

TABLE 1

| Engine Rate | Range Under Varying Load Conditions | | | | |
|---|---|---|---|---|---|
| rpm | no load | 0 ft-lb | 50 ft-lb | 100 ft-lb | 150–200 ft-lb |
| 100 | 60 | 78 | 60 | 78 | 78 |
| 200 | 60 | 78 | 60 | 78 | 78 |
| 300 | 60 | 78 | 60 | 78 | 78 |
| 400 | 60 | 78 | 60 | 78 | 78 |
| 500 | 60 | 78 | 60 | 78 | 78 |
| 600 | 60 | 78 | 60 | 78 | 78 |
| 700 | 60 | 76 | 61 | 76 | 76 |
| 800 | 60 | 75 | 64 | 75 | 75 |
| 900 | 63 | 76 | 66 | 76 | 76 |
| 1000 | 65 | 77 | 68 | 77 | 77 |
| 1100 | 67 | 81 | 72 | 81 | 81 |
| 1200 | 69 | 88 | 74 | 88 | 88 |
| 1300 | 68 | 93 | 72 | 93 | 93 |
| 1400 | 67 | 93 | 71 | 93 | 93 |
| 1500 | 65 | 90 | 70 | 90 | 90 |
| 1600 | 62 | 88 | 70 | 88 | 90 |
| 1700 | 61 | 86 | 70 | 87 | 103 |
| 1800 | 62 | 87 | 70 | 88 | 115 |
| 1900 | 65 | 85 | 71 | 89 | 125 |
| 2000 | 68 | 86 | 72 | 91 | 132 |
| 2100 | 70 | 89 | 75 | 94 | 140 |
| 2200 | 73 | 90 | 78 | 103 | 147 |
| 2300 | 76 | 99 | 81 | 109 | 152 |
| 2400 | 80 | 105 | 85 | 111 | 157 |
| 2500 | 84 | 108 | 89 | 115 | 162 |
| 2600 | 86 | 110 | 93 | 120 | 164 |
| 2700 | 88 | 112 | 98 | 124 | 165 |
| 2800 | 89 | 114 | 101 | 126 | 166 |
| 2900 | 88 | 111 | 102 | 127 | 165 |
| 3000 | 86 | 105 | 101 | 126 | 183 |
| 3100 | 83 | 103 | 100 | 125 | 158 |
| 3200 | 80 | 97 | 95 | 122 | 153 |
| 3300 | 76 | 93 | 88 | 119 | 147 |
| 3400 | 73 | 89 | 84 | 115 | 140 |
| 3500 | 69 | 84 | 81 | 111 | 132 |
| 3600 | 65 | 80 | 78 | 106 | 120 |
| 3700 | 62 | 78 | 76 | 100 | 112 |
| 3800 | 61 | 76 | 75 | 95 | 111 |

TABLE 1-continued

| Engine Rate | Range Under Varying Load Conditions | | | | |
|---|---|---|---|---|---|
| rpm | no load | 0 ft-lb | 50 ft-lb | 100 ft-lb | 150–200 ft-lb |
| 3900 | 62 | 76 | 74 | 90 | 111 |
| 4000 | 65 | 76 | 75 | 86 | 113 |
| 4100 | 70 | 78 | 76 | 85 | 115 |
| 4200 | 75 | 78 | 78 | 86 | 119 |
| 4300 | 80 | 80 | 80 | 88 | 122 |
| 4400 | 82 | 82 | 82 | 92 | 125 |
| 4500 | 84 | 83 | 83 | 97 | 126 |
| 4600 | 87 | 84 | 84 | 102 | 126 |
| 4700 | 89 | 84 | 86 | 104 | 125 |
| 4800 | 91 | 84 | 87 | 106 | 125 |
| 4900 | 94 | 84 | 89 | 107 | 125 |
| 5000 | 96 | 84 | 90 | 108 | 125 |
| 5100 | 97 | 84 | 91 | 109 | 125 |
| 5200 | 98 | 84 | 91 | 109 | 125 |
| 5300 | 98 | 84 | 91 | 109 | 125 |
| 5400 | 98 | 84 | 91 | 109 | 125 |
| 5500 | 98 | 84 | 91 | 109 | 125 |
| 5600 | 98 | 84 | 91 | 109 | 125 |
| 5700 | 98 | 84 | 91 | 109 | 125 |
| 5800 | 98 | 84 | 91 | 109 | 125 |
| 5900 | 98 | 84 | 91 | 109 | 125 |
| 6000 | 98 | 84 | 91 | 109 | 125 |
| 6100 | 98 | 84 | 91 | 109 | 125 |
| 6200 | 98 | 84 | 91 | 109 | 125 |
| 6300 | 98 | 84 | 91 | 109 | 125 |
| 6400 | 98 | 84 | 91 | 109 | 125 |
| 6500 | 98 | 84 | 91 | 109 | 125 |

TABLE 2

| Engine Rate | SVAR Under Varying Load Conditions | | | | |
|---|---|---|---|---|---|
| rpm | no load | 0 ft-lb | 50 ft-lb | 100 ft-lb | 150–200 ft-lb |
| 100 | 13 | 17 | 15 | 15 | 17 |
| 200 | 13 | 17 | 15 | 15 | 17 |
| 300 | 13 | 17 | 15 | 15 | 17 |
| 400 | 13 | 17 | 15 | 15 | 17 |
| 500 | 13 | 17 | 15 | 15 | 17 |
| 600 | 13 | 17 | 15 | 15 | 17 |
| 700 | 13 | 16 | 14 | 14 | 18 |
| 800 | 13 | 15 | 14 | 14 | 17 |
| 900 | 13 | 14 | 14 | 14 | 19 |
| 1000 | 13 | 16 | 14 | 14 | 20 |
| 1100 | 13 | 20 | 14 | 14 | 20 |
| 1200 | 13 | 23 | 14 | 14 | 21 |
| 1300 | 13 | 24 | 14 | 14 | 24 |
| 1400 | 13 | 25 | 14 | 14 | 26 |
| 1500 | 13 | 20 | 14 | 14 | 29 |
| 1600 | 13 | 18 | 14 | 14 | 35 |
| 1700 | 13 | 17 | 14 | 15 | 44 |
| 1800 | 13 | 16 | 15 | 16 | 54 |
| 1900 | 13 | 16 | 16 | 19 | 69 |
| 2000 | 14 | 17 | 17 | 23 | 79 |
| 2100 | 14 | 18 | 18 | 31 | 88 |
| 2200 | 14 | 20 | 20 | 37 | 99 |
| 2300 | 14 | 26 | 26 | 42 | 110 |
| 2400 | 15 | 32 | 32 | 53 | 118 |
| 2500 | 16 | 36 | 36 | 62 | 124 |
| 2600 | 17 | 39 | 39 | 67 | 130 |
| 2700 | 18 | 43 | 40 | 69 | 132 |
| 2800 | 19 | 47 | 41 | 70 | 133 |
| 2900 | 20 | 49 | 42 | 70 | 132 |
| 3000 | 21 | 49 | 42 | 70 | 130 |
| 3100 | 22 | 48 | 40 | 69 | 127 |
| 3200 | 23 | 45 | 40 | 68 | 124 |
| 3300 | 23 | 42 | 38 | 67 | 118 |
| 3400 | 22 | 38 | 36 | 63 | 109 |
| 3500 | 20 | 33 | 30 | 56 | 101 |
| 3600 | 19 | 28 | 21 | 43 | 88 |
| 3700 | 18 | 24 | 19 | 30 | 75 |
| 3800 | 17 | 20 | 18 | 18 | 63 |

TABLE 2-continued

Index Ratio Corrected for 50 ft-lb

| Engine Rate rpm | SVAR Under Varying Load Conditions | | | | |
|---|---|---|---|---|---|
| | no load | 0 ft-lb | 50 ft-lb | 100 ft-lb | 150–200 ft-lb |
| 3900 | 17 | 18 | 16 | 16 | 60 |
| 4000 | 17 | 17 | 16 | 16 | 58 |
| 4100 | 17 | 17 | 17 | 17 | 56 |
| 4200 | 17 | 18 | 18 | 18 | 54 |
| 4300 | 18 | 20 | 20 | 20 | 55 |
| 4400 | 18 | 22 | 22 | 22 | 56 |
| 4500 | 19 | 23 | 23 | 23 | 57 |
| 4600 | 19 | 25 | 24 | 24 | 56 |
| 4700 | 20 | 26 | 24 | 24 | 56 |
| 4800 | 20 | 27 | 24 | 24 | 57 |
| 4900 | 21 | 27 | 24 | 24 | 56 |
| 5000 | 23 | 28 | 24 | 24 | 59 |
| 5100 | 23 | 28 | 24 | 24 | 60 |
| 5200 | 23 | 29 | 24 | 24 | 61 |
| 5300 | 23 | 29 | 24 | 24 | 61 |
| 5400 | 23 | 30 | 24 | 24 | 61 |
| 5500 | 23 | 30 | 24 | 24 | 61 |
| 5600 | 23 | 30 | 24 | 24 | 61 |
| 5700 | 23 | 30 | 24 | 24 | 61 |
| 5800 | 23 | 30 | 24 | 24 | 61 |
| 5900 | 23 | 30 | 24 | 24 | 61 |
| 6000 | 23 | 30 | 24 | 24 | 61 |
| 6100 | 23 | 30 | 24 | 24 | 61 |
| 6200 | 23 | 30 | 24 | 24 | 61 |
| 6300 | 23 | 30 | 24 | 24 | 61 |
| 6400 | 23 | 30 | 24 | 24 | 61 |
| 6500 | 23 | 30 | 24 | 24 | 61 |

TABLE 3

Index Ratio Corrected for 50 ft-lb

| Cylinder | rpm | Cyl #1 | Cyl #2 | Cyl #3 | Cyl #4 | Cyl #5 | Cyl #6 | Cyl #7 | Cyl #8 |
|---|---|---|---|---|---|---|---|---|---|
| 1 | 590 | 67 | | | | | | | |
| | 796 | 66 | | | | | | | |
| | 925 | 63 | | | | | | | |
| | 1023 | 66 | | | | | | | |
| | 1178 | 67 | | | | | | | |
| | 1359 | 65 | | | | | | | |
| | 1444 | 65 | | | | | | | |
| | 1690 | 68 | | | | | | | |
| | 1798 | 68 | | | | | | | |
| | 1931 | 65 | | | | | | | |
| | 2069 | 62 | | | | | | | |
| | 2367 | 60 | | | | | | | |
| | 2618 | 57 | | | | | | | |
| | 2824 | 57 | | | | | | | |
| | 2973 | 62 | | | | | | | |
| | 3381 | 59 | | | | | | | |
| | 3565 | 59 | | | | | | | |
| | 3714 | 59 | | | | | | | |
| | 4065 | 58 | | | | | | | |
| 2 | 595 | | 154 | | | | | | |
| | 773 | | 157 | | | | | | |
| | 914 | | 159 | | | | | | |
| | 1082 | | 158 | | | | | | |
| | 1254 | | 159 | | | | | | |
| | 1413 | | 159 | | | | | | |
| | 1614 | | 163 | | | | | | |
| | 1937 | | 158 | | | | | | |
| | 2006 | | 156 | | | | | | |
| | 2139 | | 154 | | | | | | |
| | 2315 | | 153 | | | | | | |
| | 3592 | | 155 | | | | | | |
| | 2747 | | 152 | | | | | | |
| | 3009 | | 152 | | | | | | |
| | 3259 | | 154 | | | | | | |
| | 3410 | | 155 | | | | | | |
| | 3585 | | 155 | | | | | | |
| | 3734 | | 155 | | | | | | |
| | 4035 | | 155 | | | | | | |
| | 4492 | | 157 | | | | | | |
| 3 | 575 | | | 97 | | | | | |
| | 786 | | | 95 | | | | | |
| | 843 | | | 97 | | | | | |
| | 980 | | | 94 | | | | | |
| | 1062 | | | 96 | | | | | |
| | 1212 | | | 95 | | | | | |
| | 1327 | | | 96 | | | | | |
| | 1393 | | | 97 | | | | | |
| | 1625 | | | 98 | | | | | |
| | 1812 | | | 93 | | | | | |
| | 1970 | | | 94 | | | | | |
| | 2295 | | | 94 | | | | | |
| | 2536 | | | 93 | | | | | |
| | 2770 | | | 89 | | | | | |
| | 3047 | | | 92 | | | | | |
| | 3286 | | | 93 | | | | | |
| | 3481 | | | 93 | | | | | |
| | 3724 | | | 85 | | | | | |
| | 4078 | | | 87 | | | | | |
| | 4410 | | | 89 | | | | | |
| | 4655 | | | 88 | | | | | |
| | 4828 | | | 86 | | | | | |
| 4 | 569 | | | | 256 | | | | |
| | 808 | | | | 254 | | | | |
| | 930 | | | | 255 | | | | |
| | 1100 | | | | 254 | | | | |
| | 1175 | | | | 267 | | | | |
| | 1249 | | | | 268 | | | | |
| | 1716 | | | | 255 | | | | |
| | 2047 | | | | 253 | | | | |
| | 2414 | | | | 252 | | | | |
| | 2703 | | | | 248 | | | | |
| | 2848 | | | | 250 | | | | |
| | 3038 | | | | 250 | | | | |
| | 3207 | | | | 251 | | | | |
| | 3501 | | | | 250 | | | | |
| | 3755 | | | | 249 | | | | |
| | 3968 | | | | 251 | | | | |
| | 4122 | | | | 251 | | | | |
| | 4261 | | | | 253 | | | | |
| 5 | 574 | | | | | 223 | | | |
| | 679 | | | | | 223 | | | |
| | 735 | | | | | 225 | | | |
| | 792 | | | | | 231 | | | |
| | 938 | | | | | 223 | | | |
| | 1054 | | | | | 223 | | | |
| | 1140 | | | | | 224 | | | |
| | 1272 | | | | | 225 | | | |
| | 1318 | | | | | 226 | | | |
| | 1424 | | | | | 225 | | | |
| | 1536 | | | | | 228 | | | |
| | 1661 | | | | | 225 | | | |
| | 1803 | | | | | 223 | | | |
| | 1982 | | | | | 223 | | | |
| | 2327 | | | | | 220 | | | |
| | 2515 | | | | | 219 | | | |
| | 2667 | | | | | 219 | | | |
| | 2772 | | | | | 224 | | | |
| | 2872 | | | | | 222 | | | |
| | 3162 | | | | | 224 | | | |
| | 3332 | | | | | 224 | | | |
| | 3491 | | | | | 218 | | | |
| | 3714 | | | | | 219 | | | |
| | 3865 | | | | | 214 | | | |
| | 4012 | | | | | 214 | | | |
| | 4321 | | | | | 214 | | | |
| | 4642 | | | | | 217 | | | |
| 6 | 575 | | | | | | 188 | | |
| | 792 | | | | | | 189 | | |
| | 902 | | | | | | 190 | | |
| | 1131 | | | | | | 201 | | |
| | 1231 | | | | | | 204 | | |

TABLE 3-continued

| | | Index Ratio Corrected for 50 ft-lb | | | | | | | |
|---|---|---|---|---|---|---|---|---|---|
| Cyl-inder | rpm | Cyl #1 | Cyl #2 | Cyl #3 | Cyl #4 | Cyl #5 | Cyl #6 | Cyl #7 | Cyl #8 |
| | 1334 | | | | | | 202 | | |
| | 1432 | | | | | | 192 | | |
| | 1629 | | | | | | 205 | | |
| | 1937 | | | | | | 207 | | |
| | 2139 | | | | | | 189 | | |
| | 2373 | | | | | | 184 | | |
| | 2718 | | | | | | 184 | | |
| | 2907 | | | | | | 215 | | |
| | 2932 | | | | | | 219 | | |
| | 2965 | | | | | | 222 | | |
| | 3055 | | | | | | 220 | | |
| | 3241 | | | | | | 200 | | |
| | 3501 | | | | | | 202 | | |
| | 3724 | | | | | | 204 | | |
| | 3952 | | | | | | 204 | | |
| | 4122 | | | | | | 212 | | |
| | 4373 | | | | | | 211 | | |
| | 4555 | | | | | | 217 | | |
| | 4842 | | | | | | 217 | | |
| 7 | 587 | | | | | | | 126 | |
| | 898 | | | | | | | 126 | |
| | 1092 | | | | | | | 133 | |
| | 1231 | | | | | | | 137 | |
| | 1355 | | | | | | | 139 | |
| | 1444 | | | | | | | 130 | |
| | 1518 | | | | | | | 132 | |
| | 1747 | | | | | | | 140 | |
| | 1883 | | | | | | | 125 | |
| | 1970 | | | | | | | 125 | |
| | 2112 | | | | | | | 124 | |
| | 2340 | | | | | | | 125 | |
| | 2546 | | | | | | | 126 | |
| | 2786 | | | | | | | 126 | |
| | 2889 | | | | | | | 127 | |
| | 3038 | | | | | | | 124 | |
| | 3090 | | | | | | | 123 | |
| | 3277 | | | | | | | 126 | |
| | 3546 | | | | | | | 120 | |
| | 3897 | | | | | | | 153 | |
| | 4213 | | | | | | | 123 | |
| | 4361 | | | | | | | 125 | |
| | 4842 | | | | | | | 121 | |
| 8 | 597 | | | | | | | | 32 |
| | 805 | | | | | | | | 34 |
| | 912 | | | | | | | | 38 |
| | 1005 | | | | | | | | 38 |
| | 1127 | | | | | | | | 40 |
| | 1317 | | | | | | | | 44 |
| | 1531 | | | | | | | | 40 |
| | 1708 | | | | | | | | 43 |
| | 1942 | | | | | | | | 42 |
| | 2211 | | | | | | | | 24 |
| | 2508 | | | | | | | | 24 |
| | 2762 | | | | | | | | 23 |
| | 3081 | | | | | | | | 30 |
| | 3342 | | | | | | | | 32 |
| | 3501 | | | | | | | | 46 |
| | 3766 | | | | | | | | 23 |
| | 4024 | | | | | | | | 22 |
| | 4273 | | | | | | | | 18 |
| | 4629 | | | | | | | | 20 |

I claim:

1. A system for monitoring engine performance characteristics comprising:
    a pressure sensor coupled to an exhaust manifold of an engine being monitored by the system, said pressure sensor generating a pressure signal indicative of a pressure within the exhaust manifold;
    a motion sensor operatively coupled to a block of the engine, said motion sensor generating an engine motion signal indicative of a movement of the engine block;
    an engine position sensor generating a cam signal indicative of a position of a cam shaft of the engine; and
    a processor programmed to process the pressure signal, the engine motion signal and the cam signal, to determine when a magnitude of the pressure signal changes in a predetermined manner, to determine when characteristics of the engine motion signal satisfy predetermined criteria, and to detect the occurrence of a knock in the engine when the magnitude of the pressure signal changes in the predetermined manner and the characteristics of the engine motion signal satisfy the predetermined criteria within a predetermined time interval.

2. The system for monitoring engine performance characteristics of claim 1 wherein:
    said processor is programmed to process the cam signal to associate a cylinder of the engine with the knock and to generate a knocking cylinder identification signal which identifies the cylinder associated with the knock.

3. The system for monitoring engine performance characteristics of claim 1 further comprising:
    a load sensor operatively coupled to the engine to generate an engine load signal indicative of a load condition of the engine;
    said processor being programmed to process the pressure signal and the engine load signal to determine an occurrence of a misfire in the engine.

4. The system for monitoring engine performance characteristics of claim 3 wherein:
    said processor is programmed to process the cam signal to associate a cylinder of the engine with the misfire, and generate a misfiring cylinder identification signal which identifies the cylinder associated with the misfire.

5. A method for monitoring engine performance characteristics comprising the steps of:
    providing a pressure signal indicative of a pressure within an exhaust manifold of an engine using a single pressure transducer associated with said manifold;
    providing an engine motion signal indicative of a movement of a block of the engine;
    providing a cam signal indicative of a position of a camshaft of the engine; and
    employing a processor to process the pressure signal, the engine motion signal and the cam signal, to determine when a magnitude of the pressure signal changes in a predetermined manner, to determine when characteristics of the engine motion signal satisfy predetermined criteria, and to detect the occurrence of a knock in the engine when the magnitude of the pressure signal changes in the predetermined manner and the characteristics of the engine motion signal satisfy the predetermined criteria within a predetermined time interval.

6. The method for monitoring engine performance characteristics of claim 5 further comprising the step of:
    employing the processor to process the cam signal to associate a cylinder of the engine with the knock and to generate a knocking cylinder identification signal which identifies the cylinder associated with the knock.

7. The method for monitoring engine performance characteristics of claim 5 further comprising the steps of:
    providing an engine load signal indicative of a load condition of the engine; and
    employing the processor to process the pressure signal and the engine load signal to determine an occurrence of a misfire in the engine.

8. The method for monitoring engine performance characteristics of claim 7 further comprising the step of:

employing the processor to process the cam signal to associate a cylinder of the engine with the misfire and to generate a misfiring cylinder identification signal which identifies the cylinder associated with the misfire.

9. A system for monitoring engine performance characteristics comprising:

a pressure sensor coupled to an exhaust manifold of an engine being monitored by the system, said pressure sensor generating a pressure signal indicative of a pressure within the exhaust manifold; and a processor adapted to process the pressure signal from a single pressure transducer to detect an occurrence of a knock in the engine and to generate a knock indication signal for identifying the cylinder associated with the knock.

10. The system for monitoring engine performance characteristics of claim 9 wherein:

said processor is adapted to detect the occurrence of a knock in the engine when a magnitude of the pressure signal changes in a predetermined manner.

11. The system for monitoring engine performance characteristics of claim 9 further comprising:

an engine position sensor generating a cam signal indicative of a position of a cam shaft of the engine;

said processor being adapted to process th e pressure signal and the cam signal to detect the occurrence of a knock in the engine, associate a cylinder of the engine with the knock, and generate a knocking cylinder identification signal which identifies the cylinder associated with the knock.

12. The system for monitoring engine performance characteristics of claim 9 further comprising:

a motion sensor operatively coupled to a block of the engine, said motion sensor generating an engine motion signal indicative of a movement of the engine block;

said processor being adapted to process the pressure signal and the engine motion signal to detect the occurrence of a knock in the engine.

13. The system for monitoring engine performance characteristics of claim 12 wherein:

said processor is adapted to determine when a magnitude of the pressure signal changes in a predetermined manner, to determine when characteristics of the engine motion signal satisfy predetermined criteria, and to detect the occurrence of a knock in the engine when the magnitude of the pressure signal change in the predetermined manner and the characteristics of the engine motion signal satisfy the predetermined criteria.

14. The system for monitoring engine performance characteristics of claim 9 further comprising:

a load sensor operatively coupled to the engine to generate an engine load signal indicative of a load condition of the engine;

said processor being adapted to process the pressure signal and the engine load signal to determine an occurrence of a misfire in the engine.

15. The system for monitoring engine performance characteristics of claim 14 further comprising:

an engine position sensor generating a cam signal indicative of a position of a cam shaft of the engine;

said processor being adapted to process the pressure signal, the engine load signal and the cam signal to detect the occurrence of a misfire in the engine, associate a cylinder of the engine with the misfire, and generate a misfiring cylinder identification signal which identifies the cylinder associated with the misfire.

16. A method for monitoring engine performance characteristics comprising the steps of:

generating a pressure signal indicative of a pressure within an exhaust manifold of an engine using a single pressure transducer associated with said manifold; and employing a processor to process the pressure signal to detect an occurrence of a knock in the engine.

17. The method for monitoring engine performance characteristics of claim 16 further comprising the steps of:

employing a motion sensor operatively coupled to a block of the engine to generate an engine motion signal indicative of a movement of the engine block; and employing the processor to process the pressure signal and the engine motion signal to detect the occurrence of a knock in the engine.

18. The method for monitoring engine performance characteristics of claim 17 wherein:

said step of employing the processor further comprises employing the processor to determine when a magnitude of the pressure signal changes in a predetermined manner, to determine when characteristics of the engine motion signal satisfy predetermined criteria, and to detect the occurrence of a knock in the engine when the magnitude of the pressure signal change in the predetermined manner and the characteristics of the engine motion signal satisfy the predetermined criteria.

19. The method for monitoring engine performance characteristics of claim 16 further comprising the steps of:

providing an engine load signal indicative of a load condition of the engine; and employing the processor to process the pressure signal and the engine load signal to determine an occurrence of a misfire in the engine.

20. The method for monitoring engine performance characteristics of claim 16 wherein:

said step of generating a pressure signal further comprises employing an inexpensive diaphragm type pressure sensor.

21. The system for monitoring engine performance characteristics of claim 9 wherein:

said pressure sensor is an inexpensive diaphragm type pressure sensor.

22. A system for monitoring engine performance characteristics comprising:

a pressure sensor coupled to an exhaust manifold of an engine being monitored by the system, said pressure sensor generating a pressure signal indicative of a pressure within the exhaust manifold; and circuitry for indicating a knock when a pressure pulse for a cylinder as indicated by said pressure sensor is substantially greater than a normal level for the engine operating condition, and for indicating a misfire when the pressure pulse for a cylinder is substantially less than a normal level for the engine operating condition.

23. The system for monitoring engine performance characteristics of claim 22 wherein:

said pressure sensor is an inexpensive diaphragm type pressure sensor.

24. A system for monitoring engine performance characteristics comprising:

a pressure sensor coupled to an exhaust manifold of an engine being monitored by the system, said pressure sensor generating a pressure signal indicative of a pressure within the exhaust manifold, said pressure sensor being an inexpensive diaphragm type pressure sensor;

an engine position sensor generating a cam signal indicative of the position of a cam shaft of the engine; and a processor programmed to process the pressure signal, the engine motion signal and the cam signal, to determine when a magnitude of the pressure signal changes in a predetermined manner, to determine when characteristics of the engine motion signal satisfy predetermined criteria, to detect the occurrence of a knock in the engine when the magnitude of the pressure signal changes in the predetermined manner and the characteristics of the engine motion signal satisfy the predetermined criteria within a predetermined time interval, to associate a cylinder of the engine with the knock and to generate a knocking cylinder identification signal which identifies the cylinder associated with the knock.

* * * * *